US012800892B2

(12) United States Patent
Suzuki

(10) Patent No.: US 12,800,892 B2
(45) Date of Patent: Nov. 17, 2026

(54) ZOOM LENS AND IMAGE PICKUP APPARATUS

(71) Applicant: CANON KABUSHIKI KAISHA, Tokyo (JP)

(72) Inventor: Takumi Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 18/939,753

(22) Filed: Nov. 7, 2024

(65) Prior Publication Data

US 2025/0180881 A1 Jun. 5, 2025

(30) Foreign Application Priority Data

Dec. 5, 2023 (JP) ................................ 2023-205264

(51) Int. Cl.
*G02B 15/14* (2006.01)

(52) U.S. Cl.
CPC ................ *G02B 15/145527* (2019.08); *G02B 15/144513* (2019.08); *G02B 15/145511* (2019.08); *G02B 15/1465* (2019.08)

(58) Field of Classification Search
None
See application file for complete search history.

(56) References Cited

U.S. PATENT DOCUMENTS

| | | | | |
|---|---|---|---|---|
| 2020/0310088 | A1 * | 10/2020 | Saito .................... | G02B 13/009 |
| 2024/0377614 | A1 | 11/2024 | Suzuki | |

FOREIGN PATENT DOCUMENTS

| | | | |
|---|---|---|---|
| JP | 2021135458 | A | 9/2021 |
| JP | 2021196572 | A | 12/2021 |

* cited by examiner

*Primary Examiner* — Phu Vu
(74) *Attorney, Agent, or Firm* — Carter, DeLuca & Farrell LLP

(57) ABSTRACT

A zoom lens includes, in order from an object side to an image side, a first lens unit having negative refractive power, and a rear group including at least three lens units and having combined positive refractive power at a wide-angle end. A distance between adjacent lens units changes during zooming. The first lens unit includes three negative lenses consecutively arranged from the object side to the image side. Predetermined inequalities are satisfied.

18 Claims, 12 Drawing Sheets

ZOOM LENS AND IMAGE PICKUP APPARATUS

BACKGROUND

Technical Field

The present disclosure relates to a zoom lens that is used for imaging or the like.

Description of Related Art

Each of Japanese Patent Laid-Open Nos. 2021-196572 and 2021-135458 discloses a retrofocus type zoom lens that includes, in order from an object side to an image side, a first lens unit having negative refractive power, and a rear group including a plurality of lens units. The zoom lens disclosed in Japanese Patent Laid-Open No. 2021-196572 consists of, in order from the object side, a first lens unit having negative refractive power, a second lens unit having positive refractive power, an aperture stop, a third lens unit having negative refractive power, a fourth lens unit having positive refractive power, a fifth lens unit having negative refractive power, and a sixth lens unit having negative refractive power. The zoom lens disclosed in Japanese Patent Laid-Open No. 2021-135458 consists of, in order from the object side, a first lens unit having negative refractive power, a second lens unit having positive refractive power and an aperture stop, a third lens unit having negative refractive power, and a fourth lens unit having negative refractive power.

SUMMARY

A zoom lens according to one aspect of the disclosure includes, in order from an object side to an image side, a first lens unit having negative refractive power, and a rear group including at least three lens units and having combined positive refractive power at a wide-angle end. A distance between adjacent lens units changes during zooming. The first lens unit includes three negative lenses consecutively arranged from the object side to the image side. The following inequalities are satisfied:

$$-2.5<f1/fRw<-1.0$$

$$0.3\leq BFw/(fw\times\tan\omega w)\leq 0.8$$

where f1 is a focal length of the first lens unit, fRw is a focal length of the rear group at the wide-angle end, BFw is a back focus of the zoom lens at the wide-angle end, fw is a focal length of the zoom lens at the wide-angle end, and ωw is a half angle of view of the zoom lens at the wide-angle end. In an image pickup apparatus having the above zoom lens also constitutes another aspect of the disclosure.

Further features of various embodiments of the disclosure will become apparent from the following description of embodiments with reference to the attached drawings.

DETAILED DESCRIPTION

Figure 1:
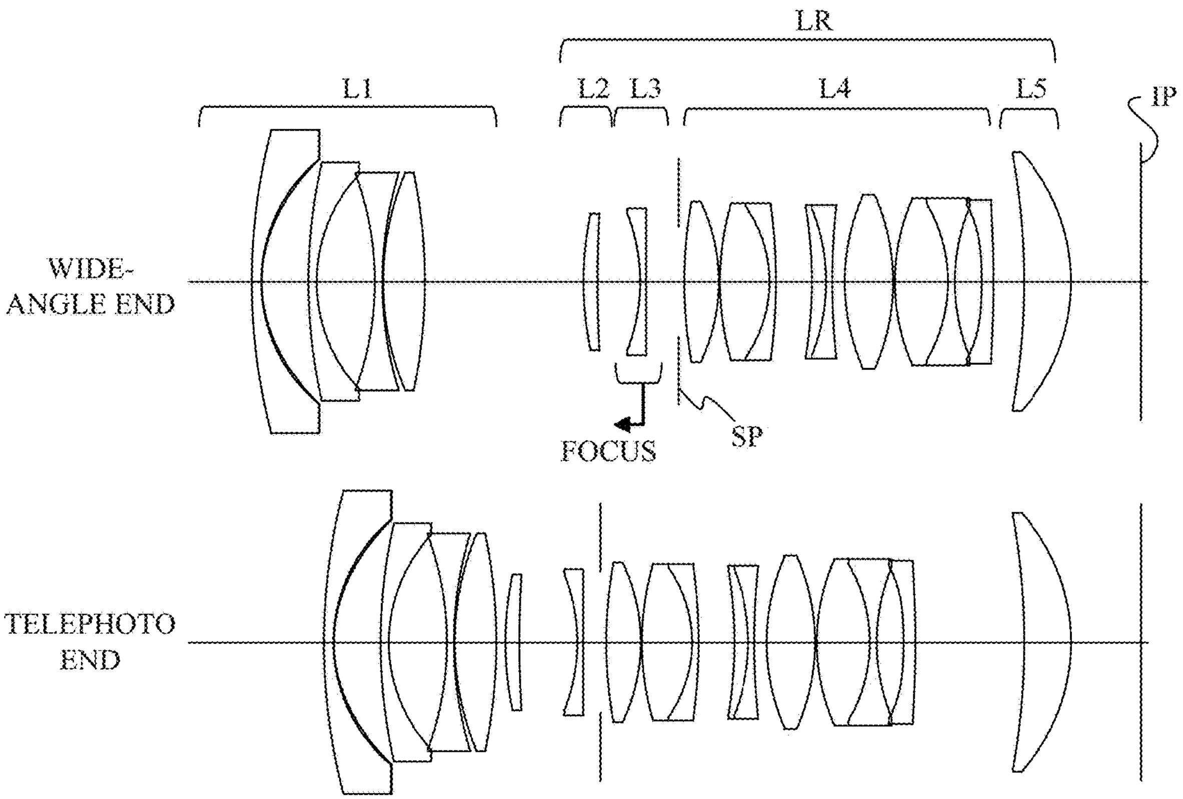
FIG. 1 is a sectional view of a zoom lens according to Example 1 at a wide-angle end and a telephoto end.

Referring now to the accompanying drawings, a description will now be given of examples according to the present disclosure. Before the zoom lenses according to Examples 1 to 5 are specifically described, matters common to the zoom lenses of respective examples will be described. FIGS. 1, 3, 5, 7, and 9 illustrate sections of the zoom lenses according to Examples 1 to 5 at a wide-angle end and a telephoto end, respectively.

The zoom lens according to each example is used as an imaging optical system for an image pickup apparatus such as a video camera, a digital still camera, a film-based camera, a television camera, an on-board (in-vehicle) camera, and a surveillance camera. The zoom lens according to each example can also be used as a projection optical system for an image projection apparatus (projector).

In each sectional view, a left side is an object side (front side), and a right side is an image side (rear side). i represents the order of lens units counted from the object side, and Li represents an i-th lens unit. In a zoom lens, a lens unit is a group of one or more lenses that move together during zooming (magnification variation) between a wide-angle end and a telephoto end. That is, a distance between adjacent lens units changes during zooming. The lens unit may include an aperture stop. The wide-angle end and the telephoto end respectively represent a maximum angle of view (shortest focal length) and a minimum angle of view (long focal length) in a case where the lens unit that moves during zooming is disposed at both ends of a mechanically or controllable movable range on the optical axis.

SP is an aperture stop that determines (limits) a light beam at a minimum F-number Fno (maximum aperture). IP is an image plane. An imaging surface (light receiving surface) of an image sensor such as a CCD sensor or a CMOS sensor, or a film surface (photosensitive surface) of a silver film is disposed on the image plane IP. An arrow labeled with "FOCUS" indicates a moving direction of the lens unit during focusing from infinity to a close distance.

The zoom lens according to each example is a zoom lens having lens units arranged in order from the object side to the image side that include a first lens unit L1 having negative refractive power (a reciprocal of the focal length), and a rear group LR that includes at least three lens units and has combined positive refractive power at the wide-angle end. In order to achieve high optical performance by satisfactorily correcting aberrations over the entire zoom range while a wide angle of view is secured in the wide-angle range, the zoom lens according to each example has a configuration in which the negative refractive power and the positive refractive power are arranged from the object side.

The first lens unit L1 does not move during zooming and focusing. The first lens unit L1 includes three lenses having negative refractive powers consecutively arranged from the object side to the image side. This configuration secures a wide angle of view in the wide-angle range while effectively correcting off-axis aberrations such as coma and curvature of field. In a case where the first lens unit L1 includes a single cemented lens in which two or more lenses are cemented together, the cemented lens is counted as two or more lenses.

Three lens units included in the rear group LR can effectively correct coma that changes with zooming, and especially spherical aberration and coma that are likely to occur with high light beams in the telephoto range.

The zoom lens according to each example may satisfy the following inequalities (1) and (2):

$$-2.5 \le f1/fRw \le -1.0 \quad (1)$$

$$0.3 \le BFw/(fw \times \tan \omega w) \le 0.8 \quad (2)$$

where f1 is a focal length of the first lens unit L1, fRw is a focal length of the rear group LR at the wide-angle end, BFw is a back focus of the zoom lens at the wide-angle end, fw is a focal length of the zoom lens system at the wide-angle end, and ωw is a half angle of view of the zoom lens at the wide-angle end. The back focus is an air equivalent value of a distance on the optical axis from a surface of the zoom lens closest to the image plane (a final surface) to the paraxial image plane. An optical component such as an optical filter and a prism that have no or very weak refractive power may be placed between the zoom lens and the image plane.

Inequality (1) defines a proper relationship between the focal length of the first lens unit L1 and the focal length of the rear group LR at the wide-angle end, and defines a condition for achieving a wide angle and good corrections of curvature of field and lateral chromatic aberration in the wide-angle range. In a case where f1/fRw becomes higher than the upper limit of inequality (1), the refractive power of the first lens unit L1 relative to the rear group LR increases. This is beneficial to size reduction of the zoom lens, but it becomes difficult to correct curvature of field and lateral chromatic aberration that occur in the first lens unit L1. In a case where f1/fRw becomes lower than the lower limit of inequality (1), the refractive power of the first lens unit L1 relative to the rear group LR reduces. This is beneficial to suppressing various aberrations caused by off-axis light beams, but it becomes difficult to achieve a wide angle and to reduce the size of the zoom lens.

Inequality (2) defines a proper relationship between the back focus in the wide-angle range, the focal length in the wide-angle range, and the tangent of the half angle of view in the wide-angle range, and a proper relationship between the back focus and the image height on the image plane. In a case where the back focus at the wide-angle end increases so that BFw/(fw×tan ωw) becomes higher than the upper limit of inequality (2), the height of an off-axis light beam passing through the final lens unit lowers, and it becomes difficult to correct curvature of field and lateral chromatic aberration. In a case where the back focus at the wide-angle end reduces so that BFw/(fw×tan ωw) becomes lower than the lower limit of inequality (2), a distance between a lens disposed closest to the image plane and the image plane (image sensor) reduces, and it becomes difficult to dispose a mount that secures a certain strength.

Inequalities (1) and (2) may be replaced with inequalities (1a) and (2a) below:

$$-2.0 \le f1/fRw \le -1.0 \quad (1a)$$

$$0.4 \le BFw/(fw \times \tan \omega w) \le 0.6 \quad (2a)$$

Due to inequality (1a), it becomes easy to suppress spherical aberration caused by an on-axis light beam in the wide-angle range, and curvature of field and lateral chromatic aberration caused by the off-axis light beam can be easily suppressed. Due to inequality (2a), it becomes easy to achieve a wider angle and reduce the size of the zoom lens.

Inequalities (1) and (2) may be replaced with inequalities (1b) and (2b) below:

$$-1.5 \le f1/fRw \le -1.0 \quad (1b)$$

$$0.45 \le BFw/(fw \times \tan \omega w) \le 0.55 \quad (2b)$$

Satisfying the above configuration and inequalities can achieve a zoom lens that has a wide angle of view at the wide-angle end, a large aperture diameter, and high optical performance.

The zoom lens according to each example may satisfy at least one of the following inequalities (3) to (14):

$$-3.0 \le f1/fw \le -1.0 \quad (3)$$

$$-2.0 \le f1/ft \le -0.5 \quad (4)$$

$$0.10 \le LD1/TLt \le 0.30 \quad (5)$$

$$0.70 \le TLt/TLw \le 1.10 \quad (6)$$

$$0.10 \le LD12w/TLw \le 0.30 \quad (7)$$

$$-0.40 \le f1/TLw \le -0.20 \quad (8)$$

$$-2.5 \le SF11 \le -1.2 \quad (9)$$

$$-4.5 \le SF12 \le -1.2 \quad (10)$$

$$-0.40 \le nd1n - nd1p \le -0.20 \quad (11)$$

$$1.2 \le \nu d1n/\nu d1p \le 2.5 \quad (12)$$

$$0.05 \le \mathrm{DRMAX} \le 0.40 \quad (13)$$

$$45° \le \omega w \le 60° \quad (14)$$

where ft is a focal length of the zoom lens at the telephoto end, LD1 is a length on the optical axis of the first lens unit L1 (lens unit thickness), LD12w is a distance on the optical axis between the first lens unit L1 and the second lens unit L2 at the wide-angle end, and TLw and TLt are overall optical lengths of the zoom lens at the wide-angle end and the telephoto end, respectively. The overall optical length is a length on the optical axis from a surface closest to an object (the frontmost surface) of the zoom lens to a final surface plus the back focus.

The first lens unit L1 may include three negative lenses from a position closest to the object. In this case, R1 is a radius of curvature of a surface on the object side of the negative lens disposed closest to the object in the first lens unit L1, R2 is a radius of curvature of a surface on the image side of the negative lens disposed closest to the object in the first lens unit L1, and SF11 is a shape factor. R3 is a radius of curvature of a surface on the object side of the second negative lens counted from the object side in the first lens unit L1, R4 is a radius of curvature of a surface on the image side of the second negative lens, and the shape factor is SF12.

The shape factor SF is defined by the following equation:

$$SF=(Rb+Ra)/(Rb-Ra)$$

where Ra is a radius of curvature of a surface on the object side of the lens, and Rb is a radius of curvature of a surface on the image side of the lens.

$$SF11=(R2+R1)/(R2-R1)$$

$$SF12=(R4+R3)/(R4-R3)$$

In a case where the surface has an aspheric shape, Ra and Rb are radius R of a base surface (reference quadratic surface) of the aspheric surface.

nd1p is an average of refractive indies for the d-line of at least one positive lens included in the first lens unit L1, and nd1n is an average of refractive indices for the d-line of the three negative lenses included in the first lens unit L1. νd1p is an average of Abbe numbers based on the d-line of at least one positive lens included in the first lens unit L1, and νd1n is an average of Abbe numbers based on the d-line of the three negative lenses included in the first lens unit L1. The Abbe number νd based on the d-line is defined as:

$$\nu d=(Nd-1)/(NF-NC)$$

where Nd, NF, and NC are refractive indices for the d-line (587.56 nm), F-line (486.1 nm), and C-line (656.3 nm) in the Fraunhofer lines.

Figure 11:
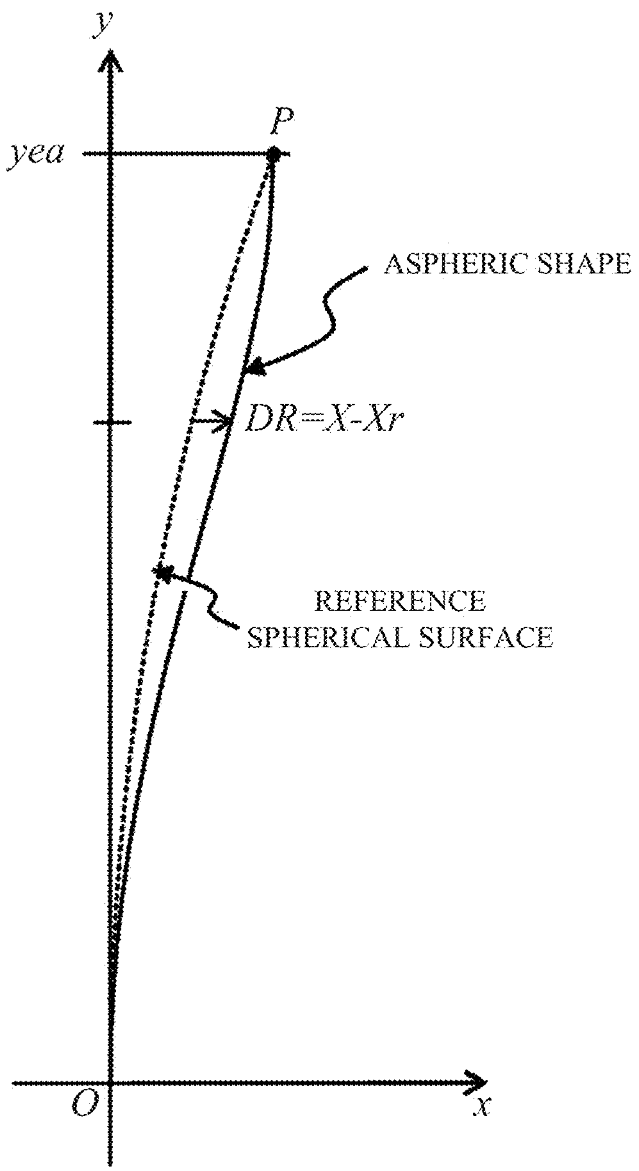
FIG. 11 is a schematic diagram of an image pickup apparatus having the zoom lens according to any one of Examples 1 to 5.

DRMAX is a maximum absolute value of an aspheric amount of the aspheric lens included in the first lens unit L1. The aspheric amount will be described with reference to FIG. 11. The aspheric amount is a positional difference in the optical axis direction between an arbitrary position on a reference spherical surface, which is a spherical surface connecting a position P corresponding to the effective diameter of the aspheric surface and a surface vertex of the aspheric surface, and a position on the aspheric surface at the same height as the arbitrary position. Thus, an aspheric amount DR is expressed as DR=X−Xr in FIG. 11. DRMAX is a maximum absolute value of DR.

Inequality (3) defines a proper relationship between the focal length of the first lens unit L1 and the focal length of the zoom lens at the wide-angle end, and defines a condition for securing a wide angle of view at the wide-angle end. In a case where the focal length of the first lens unit L1 increases relative to the focal length of the zoom lens at the wide-angle end so that f1/fw becomes higher than the upper limit of inequality (3), the divergence effect of the light beam emitted from the first lens unit L1 reduces, and the size of the rear group LR is likely to increase. In a case where the focal length of the first lens unit L1 reduces relative to the focal length of the zoom lens at the wide-angle end so that f1/fw becomes lower than the lower limit of inequality (3), the refractive power of the light beam emitted from the first lens unit L1 increases, and curvature of field and lateral chromatic aberration are likely to increase.

Inequality (4) defines a proper relationship between the focal length of the first lens unit L1 and the focal length of the zoom lens at the telephoto end, and defines a condition for securing a wide angle of view and a high magnification variation ratio at the wide-angle end. In a case where the focal length of the first lens unit L1 increases relative to the focal length of the zoom lens at the telephoto end so that f1/ft becomes higher than the upper limit of inequality (4), it becomes difficult to secure a wide angle of view at the wide-angle end. In a case where the focal length of the first lens unit L1 reduces relative to the focal length at the telephoto end of the zoom lens so that f1/ft becomes lower than the lower limit of inequality (4), the divergence effect of the light beam emitted from the first lens unit L1 increases, and it becomes difficult to secure a long focal length (high magnification variation ratio) in the telephoto range.

Inequality (5) defines a proper relationship between the lens unit thickness of the first lens unit L1 and the overall optical length of the zoom lens at the telephoto end, and defines a condition for reducing the size of the zoom lens at the telephoto end. In a case where LD1/TLt becomes higher than the upper limit of inequality (5), it is beneficial to arrange a large number of lenses in the first lens unit L1 to correct curvature of field and lateral chromatic aberration generated in the first lens unit L1 and to achieve a wide angle of view, but the focal length at the telephoto end cannot be increased to secure the required magnification variation ratio. In a case where LD1/TLt becomes lower than the lower limit of inequality (5), a moving distance of the first lens unit L1 during zooming cannot be secured, and it becomes difficult to secure the required magnification variation ratio.

Inequality (6) defines a proper relationship between the overall optical lengths of the zoom lens at the wide-angle end and the telephoto end, and defines a condition for achieving both high magnification variation and size reduction. In a case where TLt/TLw becomes higher than the upper limit of inequality (6), it becomes difficult to secure a moving distance of the lens unit that moves during zooming in the rear group LR. In a case where TLt/TLw becomes lower than the lower limit of inequality (6), it is beneficial to size reduction at the wide-angle end, but a moving distance of the lens unit that moves during zooming becomes longer, and the fluctuations of various aberrations such as spherical aberration associated with zooming increase.

Inequality (7) defines a proper relationship between an on-axis distance between the first lens unit L1 and the second lens unit L2 at the wide-angle end and the overall optical length of the zoom lens at the wide-angle end, and defines a condition for securing a moving distance of the first lens unit L1 during zooming. In a case where LD12w/TLw becomes higher than the upper limit of inequality (7), a moving distance of the first lens unit L1 during zooming increases, and the fluctuations of various aberrations such as spherical aberration associated with zooming increase. In a case where LD12w/TLw becomes lower than the lower limit of inequality (7), a moving distance of the first lens unit L1 during zooming cannot be secured, and it becomes difficult to achieve the required magnification variation ratio.

Inequality (8) defines a proper relationship between the focal length of the first lens unit L1 and the overall optical length at the wide-angle end of the zoom lens, and defines a condition for securing a wide angle of view at the wide-angle end and a high magnification variation ratio. In a case where the focal length of the first lens unit L1 increases relative to the focal length of the second lens unit L2 so that f1/TLw becomes higher than the upper limit of inequality (8), it becomes difficult to secure a wide angle of view at the wide-angle end. In a case where the focal length of the first lens unit L1 reduces relative to the focal length of the second lens unit L2 so that f1/TLw becomes lower than the lower limit of inequality (8), the divergence effect of the light beam emitted from the first lens unit L1 increases, and it becomes difficult to secure a long focal length (high magnification variation ratio) in the telephoto range.

Inequality (9) defines a condition regarding the shape factor of the negative lens closest to the object (referred to as a first negative lens hereinafter) in the first lens unit L1, and defines a condition for achieving both a wide angle of view and suppression of the curvature of field generated by the off-axis light beam. In a case where SF11 of the first negative lens is −1, the first negative lens has a plano-concave shape with a concave surface facing the image side. In a case where the refractive power of the first negative lens increases so that SF11 becomes higher than the upper limit of inequality (9), this is beneficial to a wide angle, but the curvature of the surface on the object side reduces, and coma and curvature of field increase. The curvature of the surface on the object side reduces, and it becomes difficult to process and mold the first negative lens. In a case where the curvature of the surface on the object side of the first negative lens increases so that SF11 becomes lower than the lower limit of inequality (9), this is beneficial to correction of lateral chromatic aberration, but it becomes difficult to achieve a wide angle of view.

Inequality (10) defines a condition regarding the shape factor of the second negative lens counted from the object side in the first lens unit L1 (referred to as a second negative lens hereinafter), and defines a condition for achieving both a wide angle and suppression of lateral chromatic aberration generated by off-axis light beams. In a case where SF12 of the second negative lens is −1, the second negative lens has a plano-concave shape with a concave surface facing the image side. In a case where the refractive power of the second negative lens increases so that SF12 becomes higher than the upper limit of inequality (10), this is beneficial to a wide angle scheme, but the curvature of the surface on the object side reduces, and lateral chromatic aberration increases. In addition, the curvature of the surface on the object side reduces, and it becomes difficult to process and mold the second negative lens. In a case where the curvature of the surface on the object side of the second negative lens increases so that SF12 becomes lower than the lower limit of inequality (10), this is beneficial to correction of lateral chromatic aberration, but it becomes difficult to achieve a wide angle.

Inequality (11) defines a proper relationship between the average value of the refractive indices of the three negative lenses included in the first lens unit L1 and the average value of the refractive indices of at least one positive lens included in the first lens unit L1. Properly setting the refractive indices of the lenses in the first lens unit L1 so as to satisfy this condition can achieve both reduction of each lens diameter and suppression of curvature of field that occurs in the first lens unit L1. In a case where nd1n-nd1p becomes higher than the upper limit of inequality (11), curvature of field and astigmatism can be satisfactorily suppressed, but longitudinal chromatic aberration is likely to increase. In addition, it becomes difficult to properly set the refractive powers of these negative lenses, and the lens diameters are likely to increase. In a case where nd1n-nd1p becomes lower than the lower limit of inequality (11), it becomes difficult to correct curvature of field and distortion that are mainly generated by off-axis rays. In addition, it becomes difficult to properly set the Abbe numbers of these negative lenses, and lateral chromatic aberration is likely to increase.

Inequality (12) defines a proper relationship between the average value of the Abbe numbers of the three negative lenses included in the first lens unit L1 and the average value of the Abbe numbers of the at least one positive lens included in the first lens unit L1. Properly setting the Abbe numbers of the lenses in the first lens unit L1 can achieve both a reduced lens diameter and suppression of lateral chromatic aberration that occurs in the first lens unit L1. In a case where νd1n/νd1p becomes higher than the upper limit of inequality (12), lateral chromatic aberration can be satisfactorily corrected, but longitudinal chromatic aberration is likely to increase, and it becomes difficult to properly set the refractive power of the negative lens, and the lens diameter is likely to increase. In a case where νd1n/νd1p becomes lower than the lower limit of inequality (12), it becomes easy to suppress curvature of field and distortion that are mainly caused by off-axis light rays, but it becomes difficult to correct lateral chromatic aberration.

Inequality (13) defines a proper range of an aspheric amount of the aspheric lens included in the first lens unit L1. In a case where DRMAX becomes higher than the upper limit of inequality (13), it becomes difficult to manufacture the aspheric lens. In a case where DRMAX becomes lower than the lower limit of inequality (13), it becomes difficult to correct spherical aberration and coma.

Inequality (14) defines a proper range of the half angle of view at the wide-angle end. In a case where ωw becomes higher than the upper limit of inequality (14), the angle of view becomes larger than necessary, and the size of the zoom lens increases. In a case where ωw becomes lower than the lower limit of inequality (14), it becomes difficult to achieve a wide angle.

Inequalities (3) to (14) may be replaced with inequalities (3a) to (14a) below:

$$-2.7 \leq f1/fw \leq -1.5 \quad (3a)$$

$$-1.7 \leq f1/ft \leq -0.5 \quad (4a)$$

$$0.12 \leq LD1/TLt \leq 0.27 \quad (5a)$$

$$0.80 \leq TLt/TLw \leq 1.00 \quad (6a)$$

$$0.12 \leq LD12w/TLw \leq 0.25 \quad (7a)$$

$$-0.35 \leq f1/TLw \leq -0.22 \quad (8a)$$

$$-2.3 \leq SF11 \leq -1.4 \quad (9a)$$

$$-4.2 \leq SF12-1.5 \quad (10a)$$

$$-0.35 \leq nd1n-nd1p \leq -0.22 \quad (11a)$$

$$1.4 \leq \nu d1n/\nu d1p \leq 2.2 \quad (12a)$$

$$0.08 \leq \mathrm{DRMAX} \leq 0.35 \quad (13a)$$

$$47° \leq \omega w \leq 57° \quad (14a)$$

Inequalities (3) to (14) may be replaced with inequalities (3b) to (14b) below:

$$-2.5 \leq f1/fw \leq -2.0 \quad (3b)$$

$$-1.5 \leq f1/ft \leq -1.1 \quad (4b)$$

$$0.15 \leq LD1/TLt \leq 0.25 \quad (5b)$$

$$0.85 \leq TLt/TLw \leq 0.96 \quad (6b)$$

$$0.15 \leq LD12w/TLw \leq 0.22 \quad (7b)$$

$$-0.33 \leq f1/TLw \leq -0.25 \quad (8b)$$

$$-2.1 \leq SF11 \leq -1.6 \quad (9b)$$

$$-4.0 \leq SF12 \leq -1.7 \quad (10b)$$

$$-0.33 \leq nd1n - nd1p \leq -0.24 \quad (11b)$$

$$1.6 \leq \nu d1n/\nu d1p \leq 2.0 \quad (12b)$$

$$0.10 \leq \mathrm{DRMAX} \leq 0.32 \quad (13b)$$

$$50° \leq \omega w \leq 55° \quad (14b)$$

The zoom lens according to each example may satisfy at least one of the following configurations.

The first lens unit L1 may include three negative lenses consecutively arranged in order from the object side. The first lens unit L1 may include at least one positive lens. In particular, the first lens unit L1 may include, in order from the object side, three negative lenses and one positive lens. This configuration increases the degree of freedom in selecting a glass material of the negative lens, and can satisfactorily correct various aberrations such as lateral chromatic aberration.

The negative lens in the first lens unit L1 may have an aspheric surface. This configuration can easily reduce the size of the first lens unit L1 while effectively correcting curvature of field at the wide-angle end. In the first lens unit, one or more negative lenses may have two or more aspheric surfaces. This configuration can easily increase an aperture diameter.

The second lens unit L2 may be disposed on the object side of the aperture stop SP and consist of a single lens as a positive lens. Thereby, a light beam diverged by the first lens unit L1 can be converged and almost telecentrically introduced to the third lens unit L3. Thereby variations of spherical aberration due to focusing can be easily suppressed.

The rear group LR may include at least two aspheric surfaces. This configuration can easily reduce the size of the rear group LR and effectively correct curvature of field in the wide-angle range and spherical aberration in the telephoto range.

The final lens unit closest to the image plane in the rear group LR may not move during zooming or a moving amount during zooming is small. This configuration can reduce the number of lens units that move a long distance during zooming, and easily configure a zoom drive mechanism. In addition, placing the lenses near the image plane in the telephoto range can satisfactorily correct various aberrations such as curvature of field and lateral chromatic aberration caused by off-axis light. In particular, since the final lens unit does not move during zooming, this configuration can reduce the intrusion of foreign matters such as dust into the zoom lens, which is a problem in a case where the zoom lens is attachable to and detachable from the image pickup apparatus like an interchangeable lens, and easily secure the durability of the zoom lens.

The rear group LR may include at least two cemented lenses in each of which a positive lens and a negative lens are cemented together. This configuration can satisfactorily correct various aberrations such as the variation in spherical aberration for each wavelength and longitudinal chromatic aberration in the telephoto range.

The final lens closest to the image plane in the final lens unit may be a lens that is convex toward the image side. This configuration can easily secure the back focus, and suppress the collection of unnecessary light (ghosts) caused by the image sensor.

The final lens unit may include a single lens having positive refractive power. This configuration can reduce the weight of the zoom lens, moderate an incident angle of an off-axis light beam on the image plane, and suppress color separation that occurs on the image surface.

In the zoom lens according to each example, any of the lens units may be moved in whole or in part relative to the optical axis (shifted in a direction including a component perpendicular to the optical axis, or rotated around a point on the optical axis) to serve as an image stabilizing group that reduces image blur. In the zoom lens according to each example, a whole or part of a lens unit in the rear group LR that is disposed on the image side of the aperture stop SP is used as an image stabilizing group. The number of the lenses or a shape of each lens in the image stabilizing group is not particularly limited. The image stabilizing group may have negative refractive power, and may consist of a single cemented lens in which one negative lens and one positive lens are cemented together.

In the zoom lens according to each example, focusing may be performed by moving in the optical axis direction all or part of any of the lens units as a focusing unit. In this case, the focusing unit may be disposed on the object side of the aperture stop SP. Placing the focusing unit on the object side in this way can easily suppress fluctuations in longitudinal chromatic aberration caused by focusing. The focusing unit may include one negative lens. This configuration can easily reduce the weight of the focusing unit and suppress fluctuations in lateral chromatic aberration caused by focusing.

The zoom lens according to each example may not include a diffractive optical element. Inclusion of a diffractive optical element is beneficial to chromatic aberration correction, but diffraction flare occurs in the diffractive optical element.

A description will now be given of the specific configuration of the zoom lens according to each example. After Example 5, numerical examples 1 to 5 corresponding to Examples 1 to 5, respectively, will be illustrated. In each example (numerical example), a zoom lens with high imaging performance is obtained by properly setting the magnification variation burden due to the configuration of each lens unit and the power arrangement of the lens units that move during zooming.

Example 1

A zoom lens according to Example 1 illustrated in FIG. 1 includes a first lens unit L1 having negative refractive power, a second lens unit L2 having positive refractive power, a third lens unit L3 having negative refractive power, a fourth lens unit L4 having positive refractive power including an aperture stop SP, and a fifth lens unit L5 as the final lens unit having positive refractive power. The second lens unit L2 to the fifth lens unit L5 form a rear group LR having positive refractive power. During zooming from a wide-angle end to a telephoto end, the first lens unit L1 moves toward the image side, the second lens unit L2 to the fourth lens unit L4 move toward the object side, and the fifth lens unit L5 does not move. During focusing from an object at infinity to an object at a close distance, the third lens unit L3 moves toward the object side.

Figure 2A:
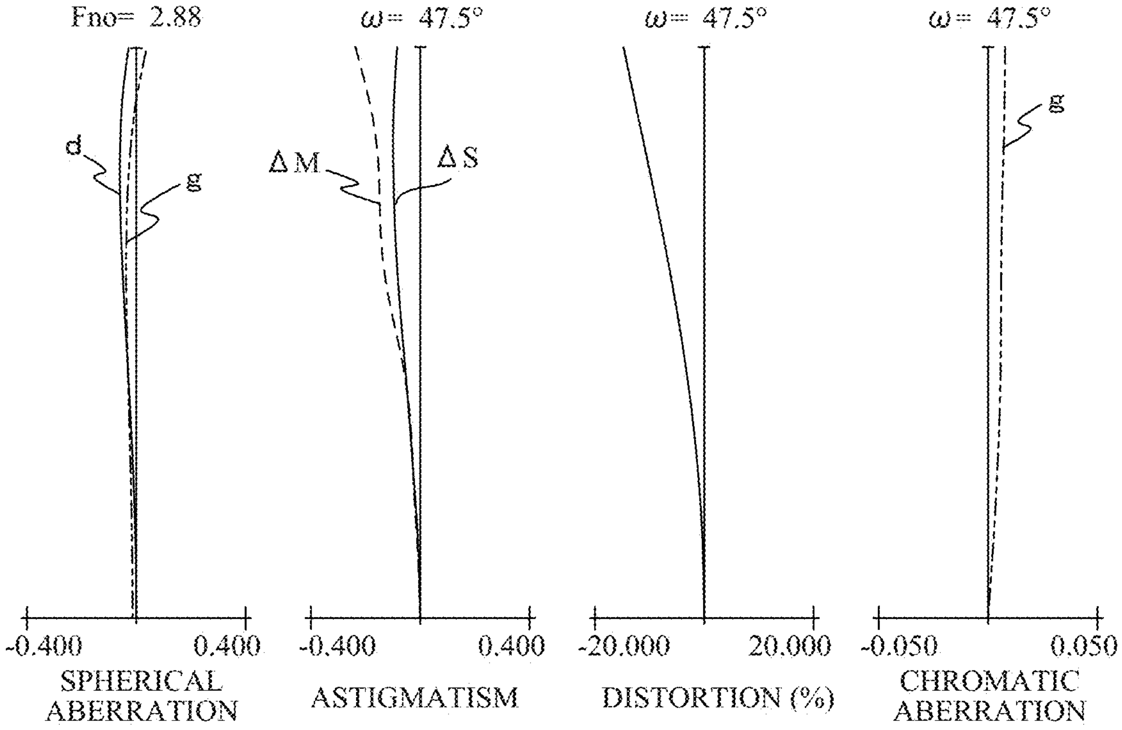
FIG. 2A is an aberration diagram of the zoom lens according to Example 1 at the wide-angle end.
Figure 2B:
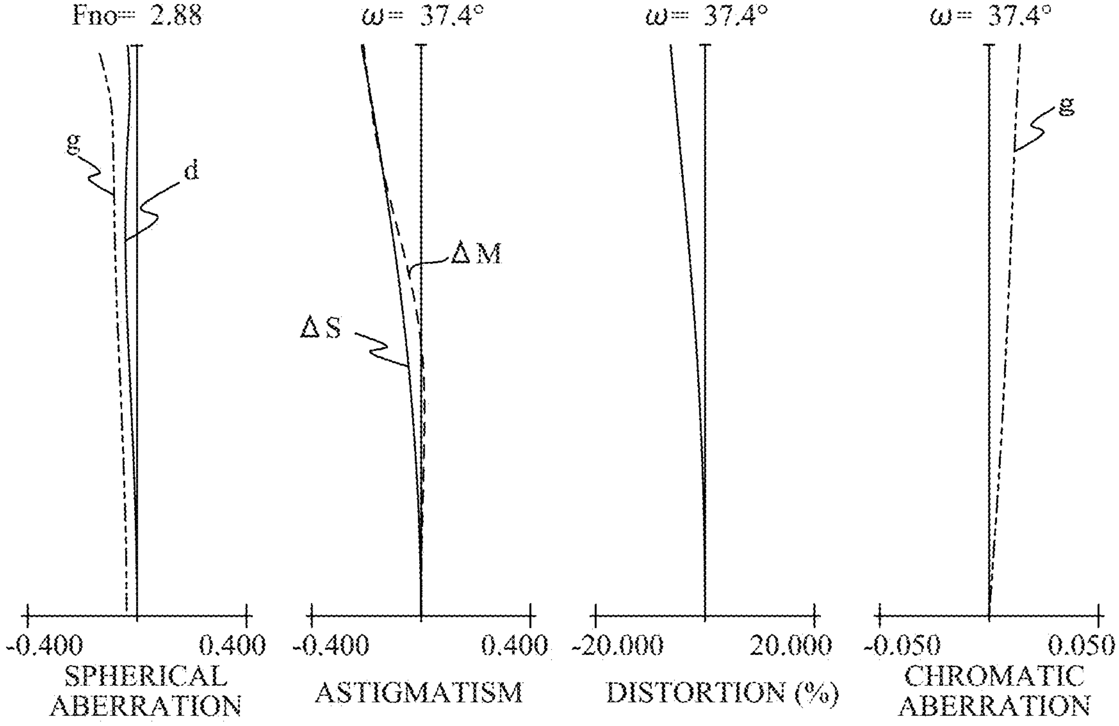
FIG. 2B is an aberration diagram of the zoom lens according to Example 1 at the telephoto end.

The zoom lens according to numerical example 1 has a magnification variation ratio of 1.7 and an aperture ratio of about 2.9. FIGS. 2A and 2B illustrate longitudinal aberration (spherical aberration, astigmatism, distortion, and chromatic aberration) of the zoom lens according to numerical example 1 at the wide-angle end and the telephoto end, respectively. In the spherical aberration diagram, Fno indicates an F-number. A solid line indicates a spherical aberration amount for the d-line (wavelength 587.6 nm), and an alternate long and two short dashes line indicates a spherical aberration amount for the g-line (wavelength 435.8 nm). In the astigmatism diagram, a solid line ΔS indicates an astigmatism amount on a sagittal image plane, and a dashed line ΔM indicates an astigmatism amount on a meridional image plane. The distortion diagram illustrates a distortion amount for the d-line. The chromatic aberration diagram illustrates a lateral chromatic aberration amount for the g-line. ω represents a half angle of view (°) as a ray tracing value. A description of these aberration diagrams is similarly applicable to the other numerical examples described later.

Example 2

Figure 3:
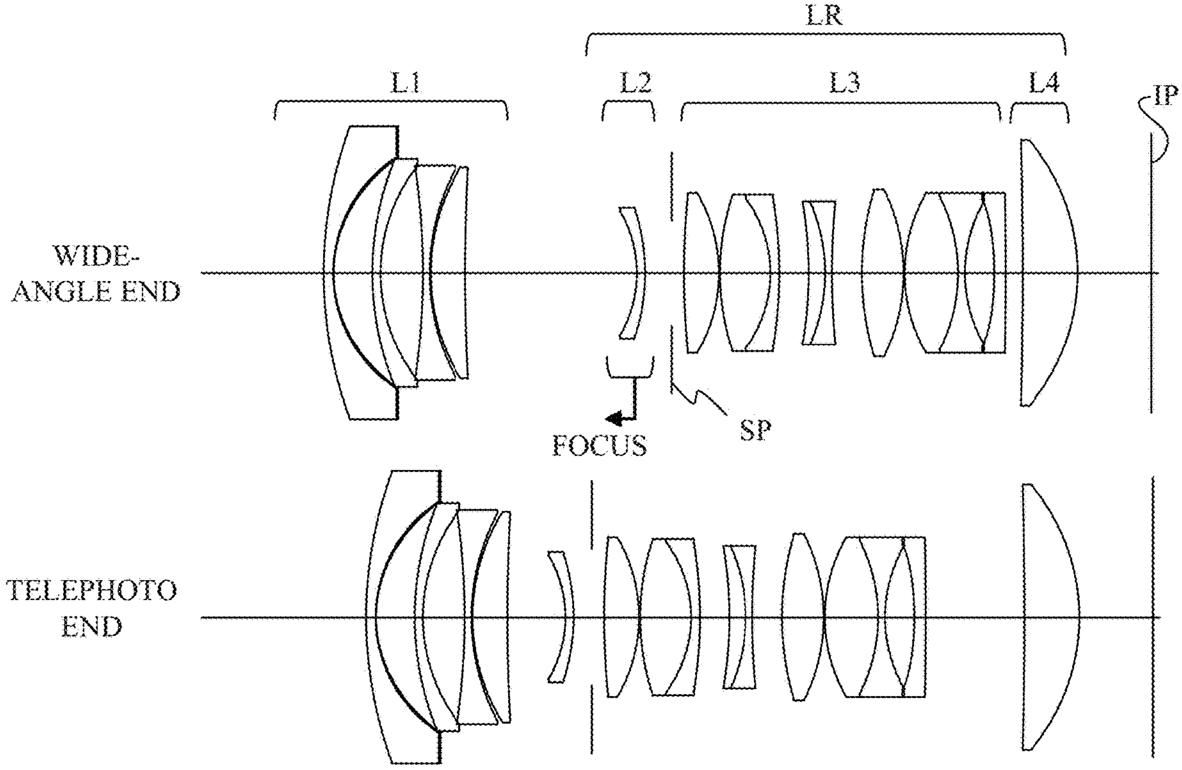
FIG. 3 is a sectional view of a zoom lens according to Example 2 at a wide-angle end and a telephoto end.

A zoom lens according to Example 2 illustrated in FIG. 3 includes a first lens unit L1 having negative refractive power, a second lens unit L2 having negative refractive power, a third lens unit L3 having positive refractive power including an aperture stop SP, and a fourth lens unit L4 as the final lens unit having positive refractive power. The second lens unit L2 to the fourth lens unit L4 form a rear group LR having positive refractive power. During zooming from a wide-angle end to a telephoto end, the first lens unit L1 moves toward the image side, the second lens unit L2 and the third lens unit L3 move toward the object side, and the fourth lens unit L4 does not move. During focusing from an object at infinity to an object at a close distance, the second lens unit L2 moves toward the object side.

Figure 4A:
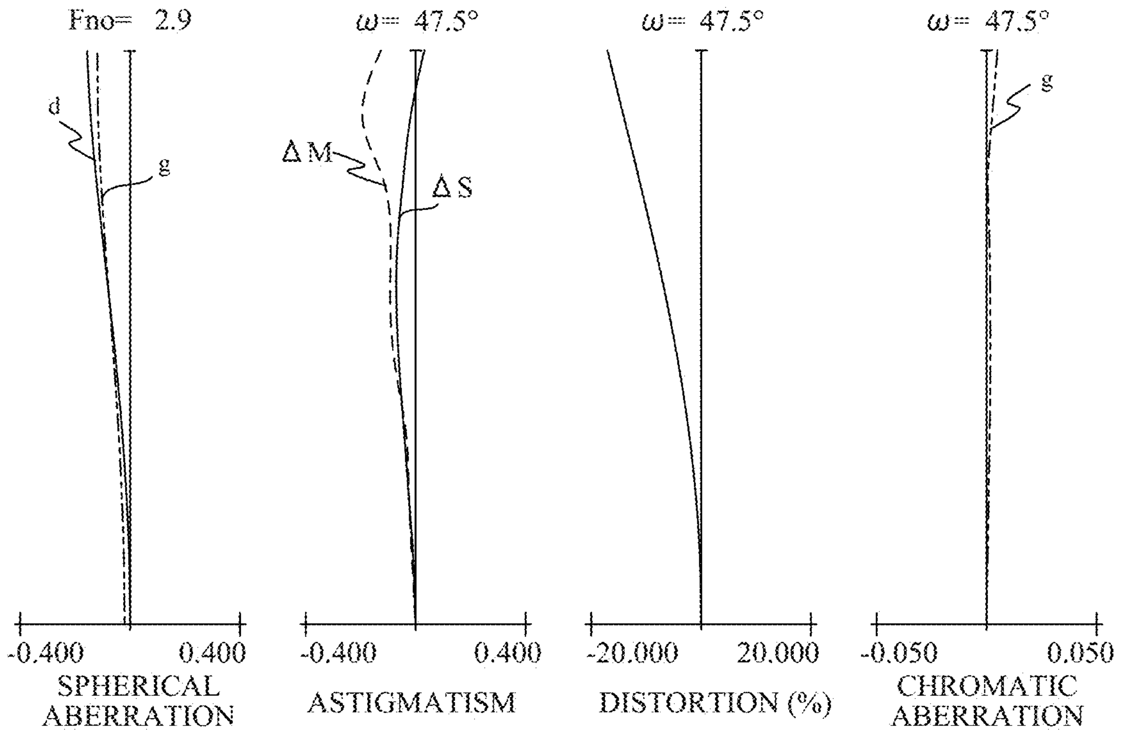
FIG. 4A is an aberration diagram of the zoom lens according to Example 2 at the wide-angle end.
Figure 4B:
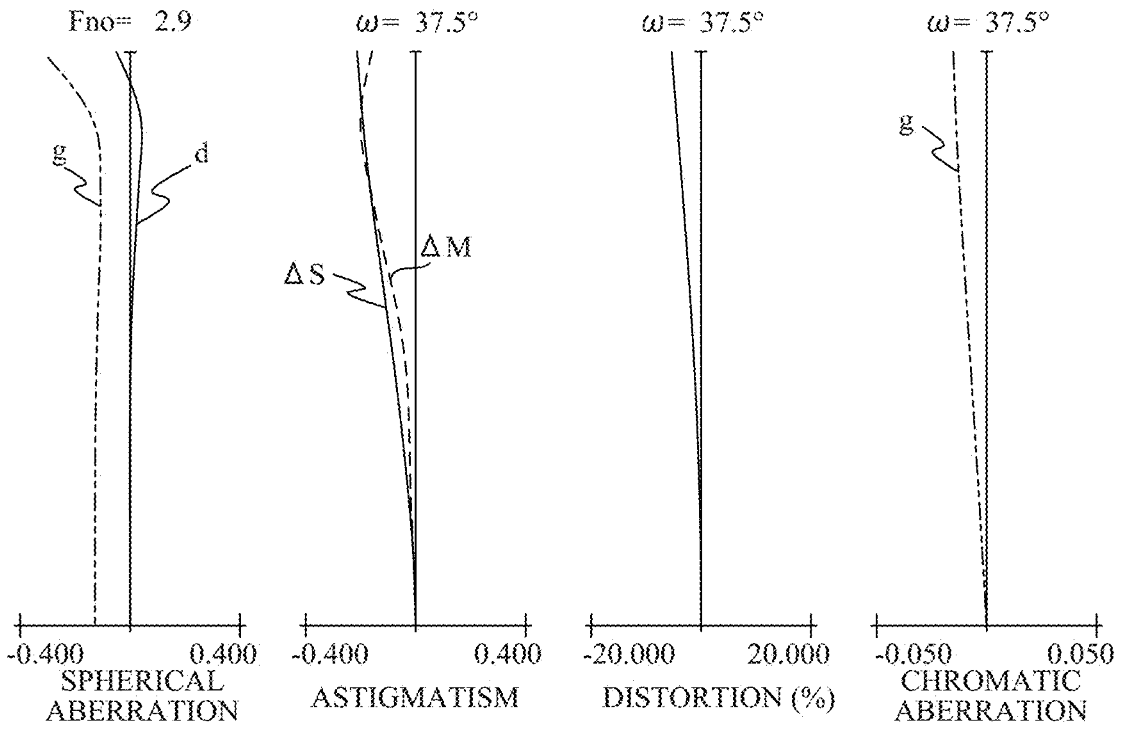
FIG. 4B is an aberration diagram of the zoom lens according to Example 2 at the telephoto end.

The zoom lens according to numerical example 2 has a magnification variation ratio of 1.6 and an aperture ratio of about 2.9. FIGS. 4A and 4B illustrate longitudinal aberrations of the zoom lens according to numerical example 2 at the wide-angle end and the telephoto end, respectively.

Example 3

Figure 5:
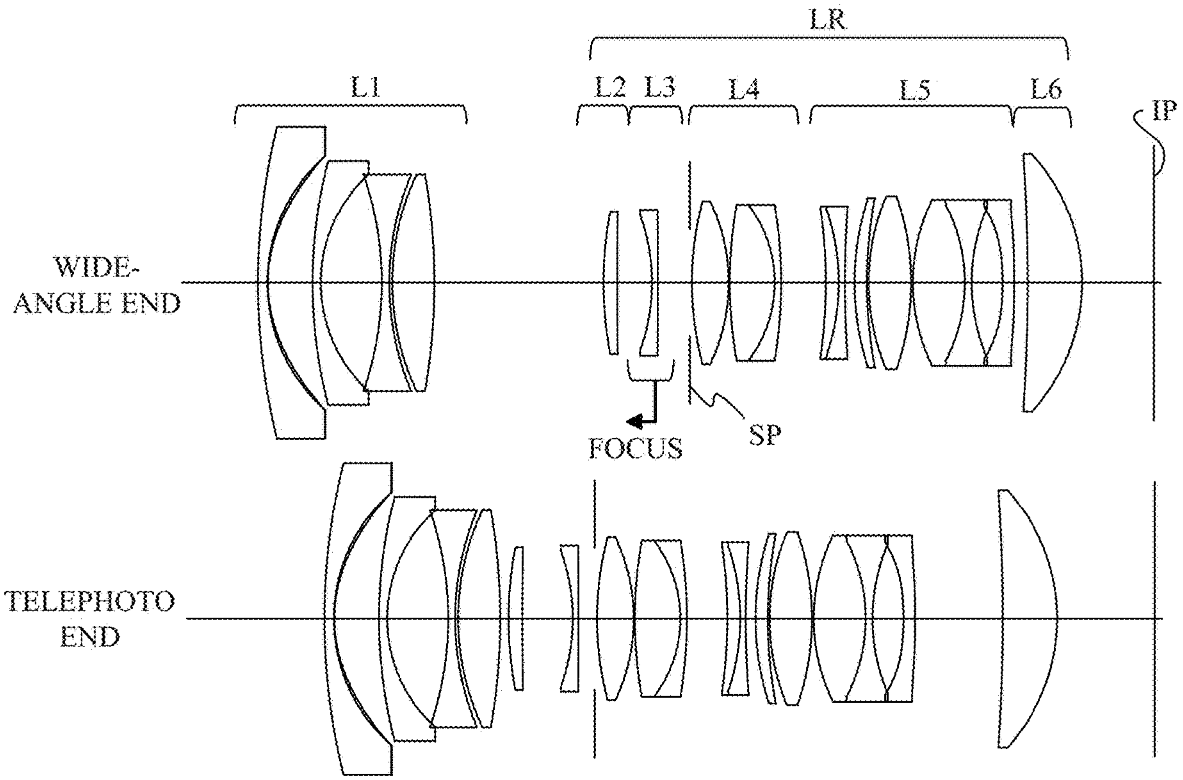
FIG. 5 is a sectional view of a zoom lens according to Example 3 at a wide-angle end and a telephoto end.

A zoom lens according to Example 3 illustrated in FIG. 5 includes a first lens unit L1 having negative refractive power, a second lens unit L2 having positive refractive power, a third lens unit L3 having negative refractive power, a fourth lens unit L4 having positive refractive power including an aperture stop SP, a fifth lens unit L5 having positive refractive power, and a sixth lens unit L6 as the final lens unit having positive refractive power. The second lens unit L2 to the sixth lens unit L6 form a rear group LR having positive refractive power. During zooming from a wide-angle end to a telephoto end, the first lens unit L1 moves toward the image side, the second lens unit L2 to the fifth lens unit L5 move toward the object side, and the sixth lens unit L6 does not move. During focusing from an object at infinity to an object at a close distance, the third lens unit L3 moves toward the object side.

Figure 6A:
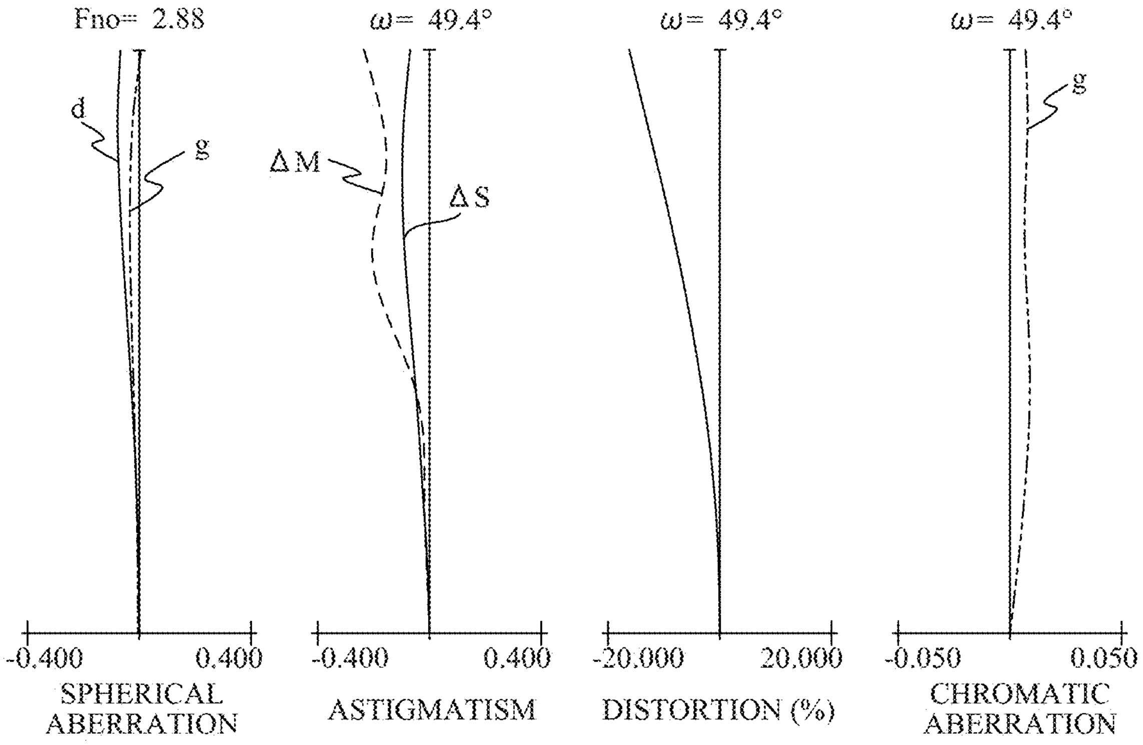
FIG. 6A is an aberration diagram of the zoom lens according to Example 3 at the wide-angle end.
Figure 6B:
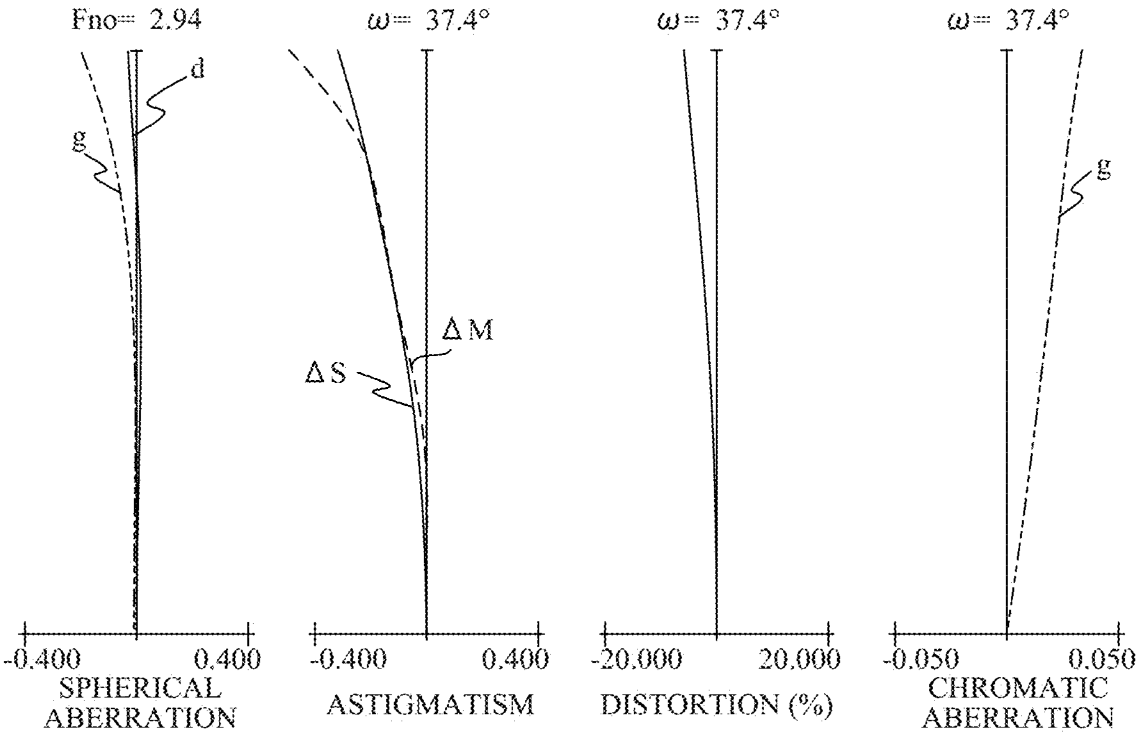
FIG. 6B is an aberration diagram of the zoom lens according to Example 3 at the telephoto end.

The zoom lens according to numerical example 3 has a magnification variation ratio of 1.8 and an aperture ratio of about 2.9. FIGS. 6A and 6B illustrate longitudinal aberrations of the zoom lens according to numerical example 3 at the wide-angle end and the telephoto end, respectively.

Example 4

Figure 7:
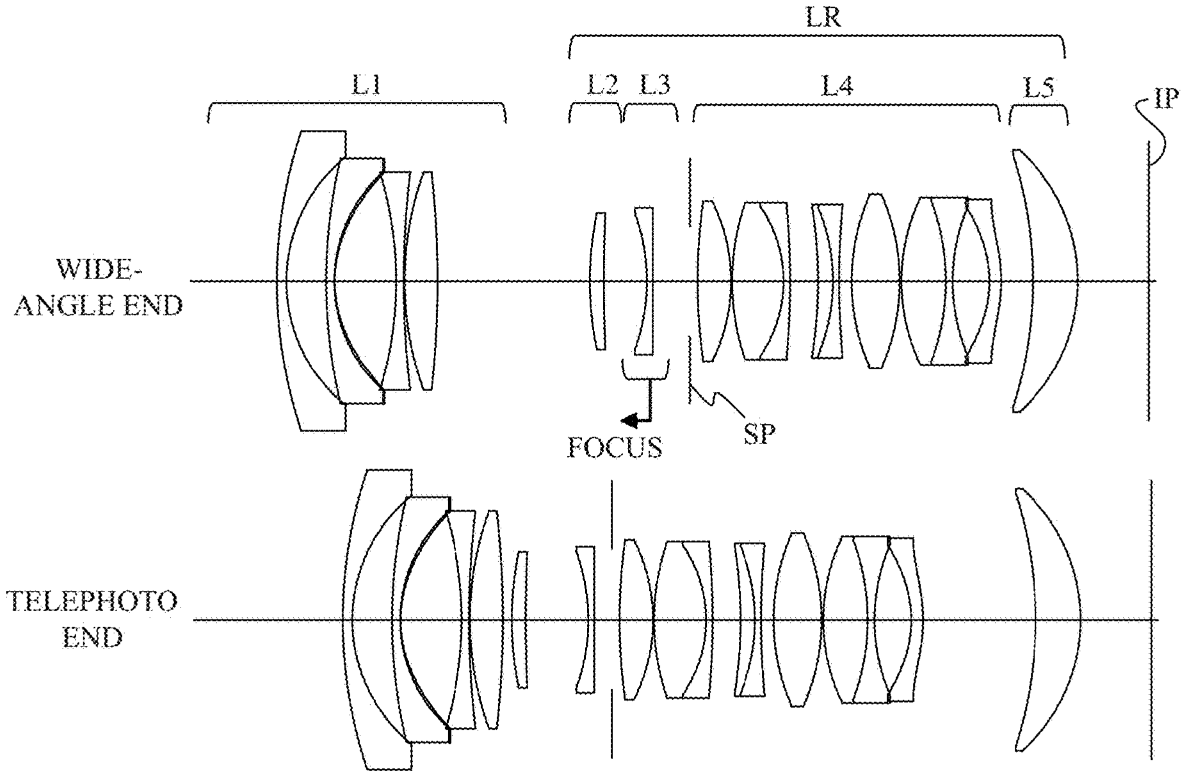
FIG. 7 is a sectional view of a zoom lens according to Example 4 at a wide-angle end and a telephoto end.

A zoom lens according to Example 4 illustrated in FIG. 7 includes a first lens unit L1 having negative refractive power, a second lens unit L2 having positive refractive power, a third lens unit L3 having negative refractive power, a fourth lens unit L4 having positive refractive power including an aperture stop SP, and a fifth lens unit L5 as the final lens unit having positive refractive power. The second lens unit L2 to the fifth lens unit L5 constitute a rear group LR having positive refractive power. During zooming from a wide-angle end to a telephoto end, the first lens unit L1 moves toward the image side, the second lens unit L2 to the fourth lens unit L4 move toward the object side, and the fifth lens unit L5 does not move. During focusing from an object at infinity to an object at a close distance, the third lens unit L3 moves toward the object side.

Figure 8A:
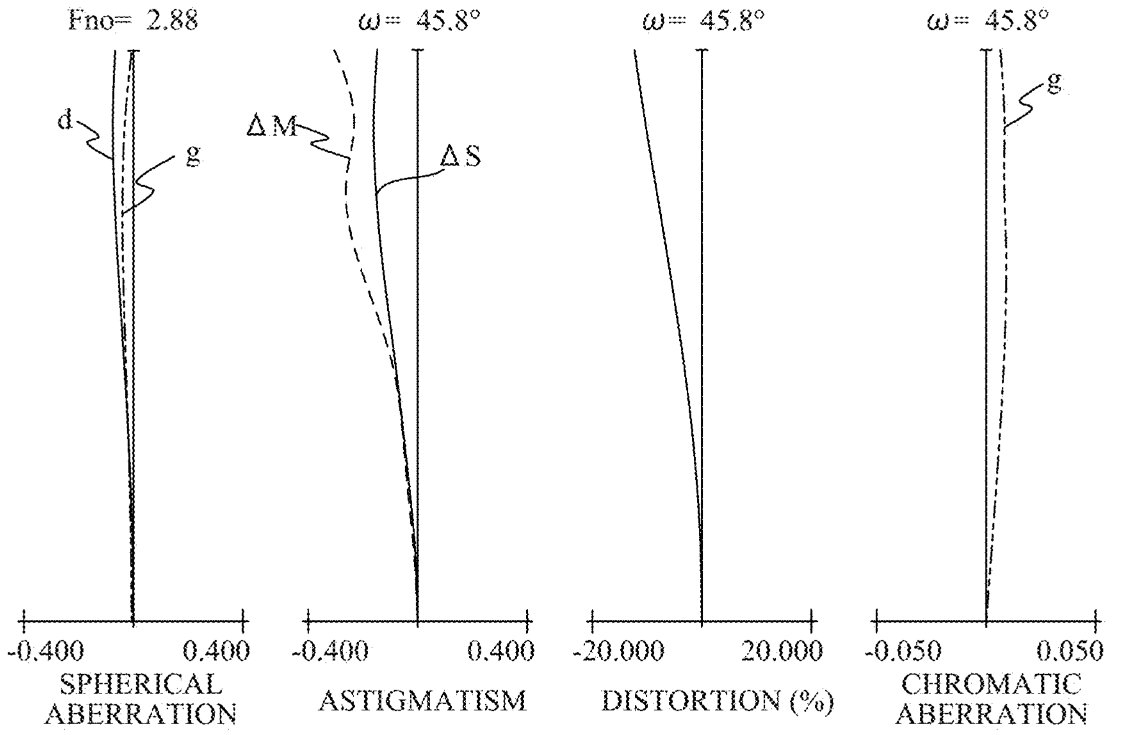
FIG. 8A is an aberration diagram of the zoom lens according to Example 4 at the wide-angle end.
Figure 8B:
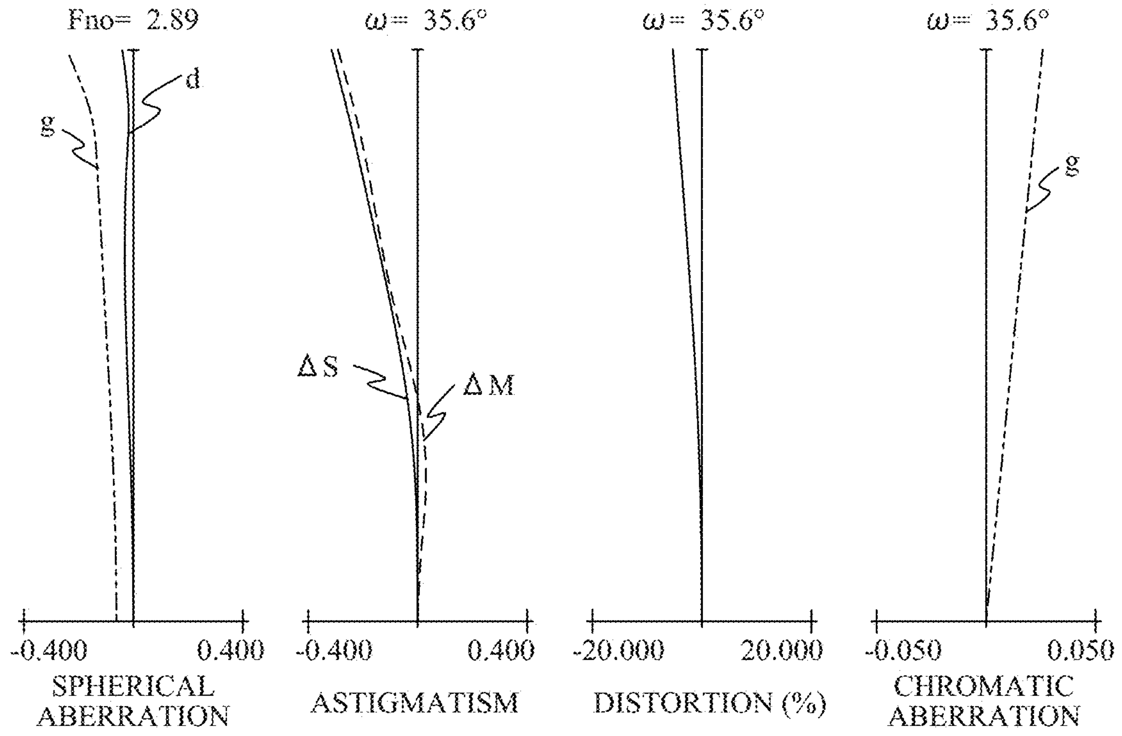
FIG. 8B is an aberration diagram of the zoom lens according to Example 4 at the telephoto end.

The zoom lens according to numerical example 4 has a magnification variation ratio of about 1.7 and an aperture ratio of about 2.9. FIGS. 8A and 8B illustrate the longitudinal aberrations of the zoom lens according to numerical example 4 at the wide-angle end and the telephoto end, respectively.

Example 5

Figure 9:
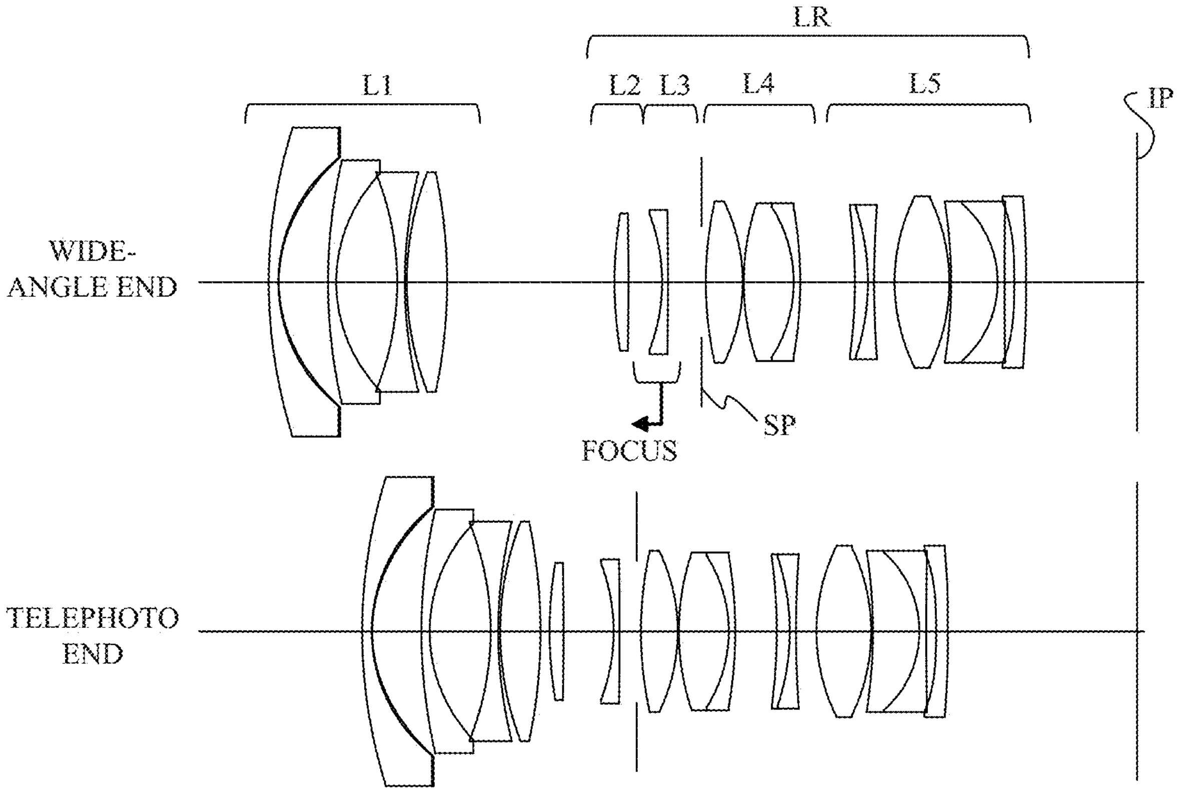
FIG. 9 is a sectional view of a zoom lens according to Example 5 at a wide-angle end and a telephoto end.

A zoom lens according to Example 5 illustrated in FIG. 9 includes a first lens unit L1 having negative refractive power, a second lens unit L2 having positive refractive power, a third lens unit L3 having negative refractive power, a fourth lens unit L4 having positive refractive power including an aperture stop SP, and a fifth lens unit L5 as the final lens unit having negative refractive power. The second lens unit L2 to the fifth lens unit L5 form a rear group LR having positive refractive power. During zooming from a wide-angle end to a telephoto end, the first lens unit L1 moves toward the image side, and the second lens unit L2 to the fifth lens unit L5 move toward the object side. During focusing from an object at infinity to an object at a close distance, the third lens unit L3 moves toward the object side.

Figure 10A:
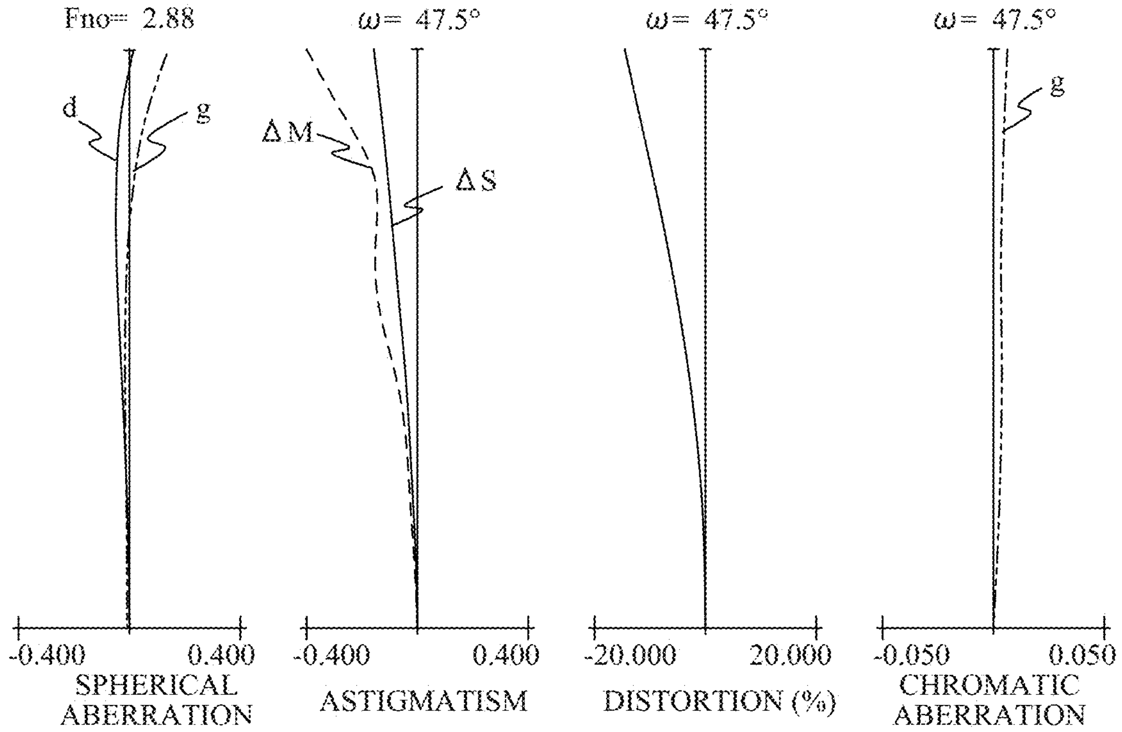
FIG. 10A is an aberration diagram of the zoom lens according to Example 5 at the wide-angle end.
Figure 10B:
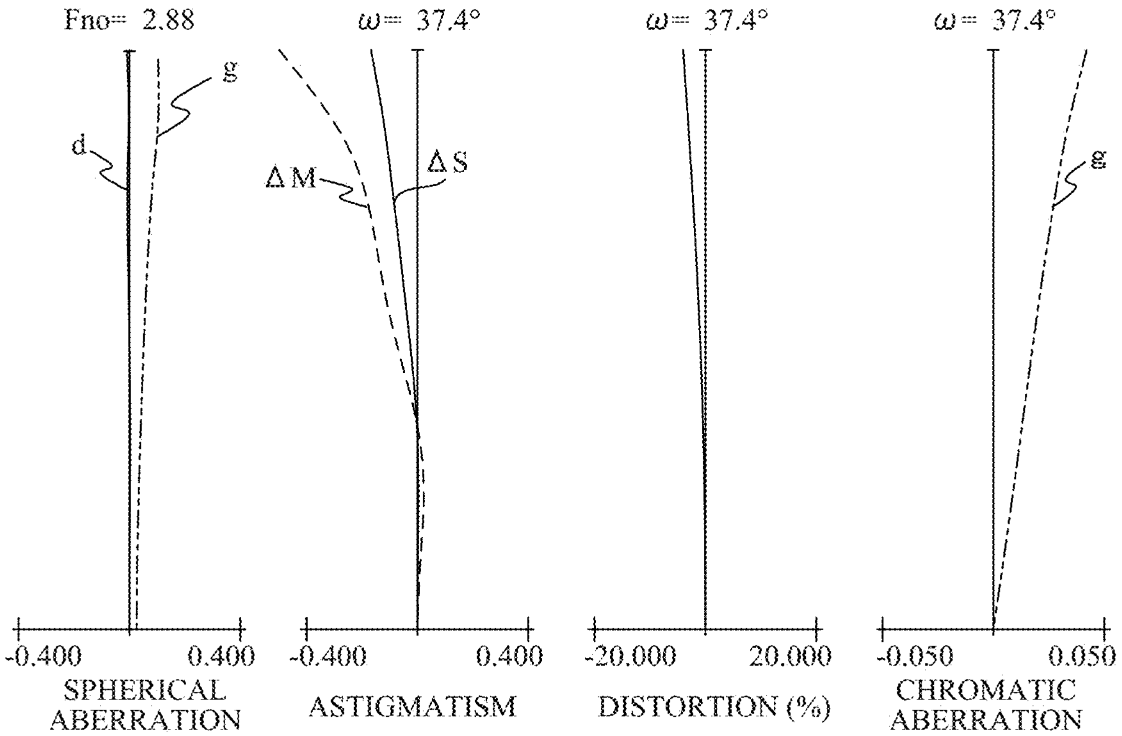
FIG. 10B is an aberration diagram of the zoom lens according to Example 5 at the telephoto end.

The zoom lens according to numerical example 5 has a magnification variation ratio of 1.7 and an aperture ratio of about 2.9. FIGS. 10A and 10B illustrate the longitudinal aberrations of the zoom lens according to numerical example 4 at the wide-angle end and the telephoto end, respectively.

Numerical examples 1 to 5 will be illustrated below. In each numerical example, a surface number i indicates the order of a surface when counted from the object side. r represents a radius of curvature (mm) of an i-th surface counted from an object side, d represents a lens thickness or air gap (mm) on the optical axis between i-th and (i+1)-th surfaces, and nd represents a refractive index for the d-line of an optical material between i-th and (i+1)-th surfaces. vd is represents an Abbe number based on the d-line of an optical material between i-th and (i+1)-th surfaces. BF represents a back focus (mm). An overall lens length (mm) corresponds to an overall optical length mentioned above. WIDE, MIDDLE, and TELE means a wide-angle end, an intermediate zoom position, and a telephoto end.

An asterisk "*" attached to a surface number means that the surface has an aspheric shape. The aspheric shape is expressed by the following expression:

$$X = \frac{\frac{H^2}{R}}{1 + \sqrt{1 - (1 + k)\left(\frac{H}{R}\right)^2}} + A4H^4 + A6H^6 + A8H^8 + A10H^{10} + A12H^{12}$$

where X is a displacement amount from a surface vertex in the optical axis direction, H is a height from the optical axis in a direction perpendicular to the optical axis, a light traveling direction is positive, R is a paraxial radius of curvature, K is a conic constant, and A4, A6, A8, A10, and A12 are aspheric coefficients. The "e±x" in the conic constant and the aspheric coefficient means "$\times10^{\pm x}$"

Table 1 summarizes values of inequalities (1) to (14) in numerical examples 1 to 5. Each numerical example satisfies all of the inequalities (1) to (14). Numerical examples 1 to 4 also satisfy all of the inequalities (1a) to (14a) and (1b) to (14b), and numerical example 5 satisfies (1a), (3a) to (14a) and (1b), (3b) to (14b).

Numerical Example 1

UNIT: mm

SURFACE DATA

| Surface No. | r | d | nd | νd |
|---|---|---|---|---|
| 1 | 88.348 | 1.40 | 1.95375 | 32.3 |
| 2 | 23.448 | 0.05 | 1.53344 | 52.7 |
| 3* | 20.527 | 6.84 | | |
| 4 | 79.576 | 1.20 | 1.48749 | 70.2 |
| 5 | 23.135 | 8.51 | | |
| 6 | −45.566 | 1.10 | 1.49700 | 81.7 |
| 7 | 54.458 | 0.12 | | |
| 8 | 41.235 | 6.10 | 1.90043 | 37.4 |
| 9 | −79.023 | (Variable) | | |
| 10 | 48.326 | 2.05 | 1.77250 | 49.6 |
| 11 | 167.459 | (Variable) | | |
| 12 | −27.423 | 0.85 | 1.60311 | 60.6 |
| 13 | ∞ | (Variable) | | |
| 14 (SP) | ∞ | 0.84 | | |
| 15 | 65.416 | 5.06 | 1.49700 | 81.7 |
| 16 | −27.205 | 0.15 | | |
| 17 | 41.064 | 7.35 | 1.49700 | 81.7 |
| 18 | −19.198 | 0.95 | 1.83481 | 42.7 |
| 19 | −81.206 | 5.25 | | |
| 20 | −64.814 | 2.07 | 1.90366 | 31.3 |
| 21 | −28.769 | 0.90 | 1.61340 | 44.3 |
| 22 | 108.154 | 1.82 | | |
| 23 | 31.407 | 7.09 | 1.49700 | 81.7 |
| 24 | −31.407 | 0.25 | | |
| 25 | 30.238 | 7.77 | 1.53775 | 74.7 |
| 26 | −22.679 | 1.00 | 1.83481 | 42.7 |
| 27 | 29.093 | 3.93 | | |
| 28* | −69.646 | 1.70 | 1.58283 | 59.5 |
| 29* | −1000.000 | (Variable) | | |
| 30 | −104.423 | 6.93 | 1.48749 | 70.2 |
| 31 | −28.354 | 10.24 | | |
| Image Plane | ∞ | | | |

ASPHERIC DATA

3rd Surface
K = 0.00000e+00 A 4 = −1.09451e−05 A 6 = 4.50666e−10 A 8 = −1.50489e−10
A10 = 4.73240e−13 A12 = −9.51176e−16
28th Surface
K = 0.00000e+00 A 4 = −9.63028e−05 A 6 = 7.20183e−08 A 8 = 1.66700e−09
A10 = −1.33893e−11 A12 = 3.80428e−14
29th Surface
K = 0.00000e+00 A 4 = −4.66095e−05 A 6 = 1.56445e−07 A 8 = 1.63379e−09
A10 = −1.04456e−11 A12 = 2.08882e−14

VARIOUS DATA
ZOOM RATIO 1.65

| | WIDE | MIDDLE | TELE |
|---|---|---|---|
| Focal Length | 16.48 | 20.00 | 27.17 |
| Fno | 2.88 | 2.88 | 2.88 |
| Half Angle of View (°) | 47.52 | 43.53 | 37.44 |
| Image Height | 18.00 | 19.00 | 20.80 |
| Overall Lens Length | 130.34 | 124.44 | 119.83 |
| BF | 10.24 | 10.24 | 10.24 |

-continued

| UNIT: mm | | | |
|---|---|---|---|
| d9 | 23.28 | 13.64 | 1.33 |
| d11 | 6.26 | 7.23 | 8.47 |
| d13 | 4.76 | 3.79 | 2.54 |
| d29 | 4.52 | 8.26 | 15.96 |

LENS DATA DATA

| Lens Unit | Starting Surface | Focal Length |
|---|---|---|
| 1 | 1 | −38.49 |
| 2 | 10 | 87.28 |
| 3 | 12 | −45.47 |
| 4 | 14 | 23.93 |
| 5 | 30 | 77.53 |

Numerical Example 2

UNIT: mm

SURFACE DATA

| Surface No. | r | d | nd | νd |
|---|---|---|---|---|
| 1 | 61.904 | 1.40 | 1.95375 | 32.3 |
| 2 | 20.247 | 0.05 | 1.51640 | 52.2 |
| 3* | 18.373 | 5.67 | | |
| 4 | 44.033 | 1.20 | 1.71828 | 55.3 |
| 5 | 25.653 | 6.21 | | |
| 6 | −106.598 | 1.00 | 1.49700 | 81.7 |
| 7 | 32.583 | 0.15 | | |
| 8 | 29.498 | 5.11 | 2.02677 | 28.4 |
| 9 | 288.201 | (Variable) | | |
| 10 | −18.019 | 1.20 | 1.51588 | 64.6 |
| 11 | −30.092 | (Variable) | | |
| 12 (SP) | ∞ | 1.80 | | |
| 13 | 117.663 | 5.12 | 1.49700 | 81.7 |
| 14 | −23.189 | 0.15 | | |
| 15 | 36.389 | 7.48 | 1.53775 | 74.7 |
| 16 | −18.380 | 1.30 | 1.91082 | 35.2 |
| 17 | −66.282 | 4.31 | | |
| 18 | −61.062 | 2.40 | 1.84666 | 23.9 |
| 19 | −25.843 | 1.00 | 1.61340 | 44.3 |
| 20 | 110.697 | 4.38 | | |
| 21 | 42.465 | 6.11 | 1.49700 | 81.7 |
| 22 | −27.481 | 0.15 | | |
| 23 | 23.479 | 7.82 | 1.53775 | 74.7 |
| 24 | −24.794 | 1.00 | 1.83481 | 42.7 |
| 25 | 21.148 | 4.28 | | |
| 26* | −55.112 | 1.70 | 1.58313 | 59.4 |
| 27* | −378.334 | (Variable) | | |
| 28 | −762.923 | 8.13 | 1.48749 | 70.2 |
| 29 | −30.263 | 10.79 | | |
| Image Plane | ∞ | | | |

ASPHERIC DATA

3rd Surface
K = 0.00000e+00 A 4 = −9.89514e−06 A 6 = 5.32321e−08 A 8 = −1.00711e−09
A10 = 7.77335e−12 A12 = −3.77833e−14 A14 = 9.76335e−17 A16 = −1.12886e−19
26th Surface
K = 0.00000e+00 A 4 = −3.77487e−05 A 6 = 4.15778e−08 A 8 = −2.33823e−09
A10 = 4.73379e−12 A12 = 3.16760e−14
27th Surface
K = 0.00000e+00 A 4 = 5.51540e−06 A 6 = 9.32432e−09 A 8 = −6.53949e−10
A10 = 1.29016e−12 A12 = 1.57567e−14

VARIOUS DATA
ZOOM RATIO 1.64

| | WIDE | MIDDLE | TELE |
|---|---|---|---|
| Focal Length | 16.48 | 23.24 | 27.08 |
| Fno | 2.90 | 2.90 | 2.90 |

-continued

| UNIT: mm | | | |
|---|---|---|---|
| Half Angle of View (°) | 47.52 | 39.27 | 37.53 |
| Image Height | 18.00 | 19.00 | 20.80 |
| Overall Lens Length | 121.45 | 116.36 | 115.52 |
| BF | 10.79 | 10.79 | 10.79 |
| d9 | 25.15 | 13.50 | 8.50 |
| d11 | 3.90 | 2.69 | 2.66 |
| d27 | 2.49 | 10.26 | 14.44 |

LENS DATA DATA

| Lens Unit | Starting Surface | Focal Length |
|---|---|---|
| 1 | 1 | −33.05 |
| 2 | 10 | −90.10 |
| 3 | 12 | 22.59 |
| 4 | 28 | 64.41 |

Numerical Example 3

UNIT: mm

SURFACE DATA

| Surface No. | r | d | nd | νd |
|---|---|---|---|---|
| 1 | 95.821 | 1.40 | 1.95375 | 32.3 |
| 2 | 24.913 | 0.05 | 1.53344 | 52.7 |
| 3* | 20.931 | 6.56 | | |
| 4 | 72.105 | 1.20 | 1.48749 | 70.2 |
| 5 | 21.713 | 8.96 | | |
| 6 | −48.789 | 1.10 | 1.49700 | 81.7 |
| 7 | 41.515 | 0.44 | | |
| 8 | 37.589 | 6.19 | 1.90043 | 37.4 |
| 9 | −93.472 | (Variable) | | |
| 10 | 56.409 | 2.01 | 1.90043 | 37.4 |
| 11 | 762.938 | (Variable) | | |
| 12 | −29.371 | 0.85 | 1.80400 | 46.5 |
| 13 | −1412.490 | (Variable) | | |
| 14 (SP) | ∞ | 0.32 | | |
| 15 | 46.742 | 5.41 | 1.49700 | 81.7 |
| 16 | −27.837 | 0.15 | | |
| 17 | 65.203 | 6.69 | 1.49700 | 81.7 |
| 18 | −18.965 | 0.95 | 1.83481 | 42.7 |
| 19 | −69.379 | (Variable) | | |
| 20 | −74.743 | 1.89 | 1.90366 | 31.3 |
| 21 | −33.041 | 0.90 | 1.61340 | 44.3 |
| 22 | 151.062 | 1.42 | | |
| 23 | 40.382 | 1.82 | 1.49700 | 81.7 |
| 24 | 67.668 | 0.25 | | |
| 25 | 32.853 | 6.24 | 1.49700 | 81.7 |
| 26 | −39.046 | 0.25 | | |
| 27 | 27.936 | 7.63 | 1.49700 | 81.7 |
| 28 | −24.955 | 1.00 | 1.83481 | 42.7 |
| 29 | 28.187 | 4.54 | | |
| 30* | −48.034 | 1.70 | 1.58313 | 59.4 |
| 31* | −500.000 | (Variable) | | |
| 32 | −276.116 | 8.07 | 1.48749 | 70.2 |
| 33 | −28.078 | (Variable) | | |
| Image Plane | ∞ | | | |

ASPHERIC DATA

3rd Surface
K = 0.00000e+00 A 4 = −1.51906e−05 A 6 = 1.91375e−08 A 8 = −2.94966e−10
A10 = 8.97817e−13 A12 = −1.34384e−15
30th Surface
K = 0.00000e+00 A 4 = −1.45126e−04 A 6 = 7.06611e−07 A 8 = −2.79426e−09
A10 = 7.89144e−12 A12 = 1.23197e−15

-continued

| UNIT: mm |
| --- |
| 31st Surface<br>K = 0.00000e+00 A 4 = −8.48617e−05 A 6 = 6.91573e−07 A 8 = −1.40031e−09<br>A10 = −1.74538e−12 A12 = 1.19952e−14 |

| VARIOUS DATA<br>ZOOM RATIO 1.76 | | | |
| --- | --- | --- | --- |
| | WIDE | MIDDLE | TELE |
| Focal Length | 15.45 | 20.00 | 27.17 |
| Fno | 2.88 | 2.88 | 2.94 |
| Half Angle of View (°) | 49.36 | 43.53 | 37.44 |
| Image Height | 18.00 | 19.00 | 20.80 |
| Overall Lens Length | 131.80 | 125.47 | 122.18 |
| BF | 10.54 | 10.14 | 14.33 |
| d9 | 24.92 | 12.85 | 1.23 |
| d11 | 5.11 | 5.74 | 7.42 |
| d13 | 4.69 | 4.06 | 2.38 |
| d19 | 6.56 | 7.42 | 5.94 |
| d31 | 2.00 | 7.27 | 12.88 |
| d33 | 10.54 | 10.14 | 14.33 |

| LENS DATA DATA | | |
| --- | --- | --- |
| Lens Unit | Starting Surface | Focal Length |
| 1 | 1 | −35.33 |
| 2 | 10 | 67.56 |
| 3 | 12 | −37.32 |
| 4 | 14 | 32.96 |
| 5 | 20 | 269.82 |
| 6 | 32 | 63.44 |

Numerical Example 4

UNIT: mm

SURFACE DATA

| Surface No. | r | d | nd | νd |
| --- | --- | --- | --- | --- |
| 1 | 69.329 | 1.40 | 1.95375 | 32.3 |
| 2 | 23.558 | 5.82 | | |
| 3 | 78.570 | 1.20 | 1.48749 | 70.2 |
| 4 | 21.518 | 0.05 | 1.53344 | 52.7 |
| 5* | 18.450 | 8.99 | | |
| 6 | −54.735 | 1.10 | 1.49700 | 81.6 |
| 7 | 136.639 | 0.12 | | |
| 8 | 47.103 | 4.83 | 1.95375 | 32.3 |
| 9 | −146.332 | (Variable) | | |
| 10 | 49.001 | 2.05 | 1.77250 | 49.6 |
| 11 | 220.527 | (Variable) | | |
| 12 | −29.277 | 0.85 | 1.62230 | 53.2 |
| 13 | ∞ | (Variable) | | |
| 14 (SP) | ∞ | 1.13 | | |
| 15 | 85.690 | 4.90 | 1.49700 | 81.6 |
| 16 | −26.257 | 0.15 | | |
| 17 | 35.427 | 7.61 | 1.49700 | 81.6 |
| 18 | −19.398 | 0.95 | 1.83481 | 42.7 |
| 19 | −123.444 | 4.09 | | |
| 20 | −68.817 | 2.18 | 1.90366 | 31.3 |
| 21 | −28.087 | 0.90 | 1.61340 | 44.3 |
| 22 | 120.221 | 1.83 | | |
| 23 | 31.663 | 7.03 | 1.49700 | 81.6 |
| 24 | −31.663 | 0.25 | | |

-continued

| UNIT: mm | | | | |
|---|---|---|---|---|
| 25 | 28.484 | 6.49 | 1.53775 | 74.7 |
| 26 | −33.812 | 1.00 | 1.83481 | 42.7 |
| 27 | 28.124 | 5.39 | | |
| 28* | −16.956 | 1.70 | 1.58313 | 59.4 |
| 29* | −24.111 | (Variable) | | |
| 30 | −60.268 | 6.63 | 1.48749 | 70.2 |
| 31 | −25.904 | 10.38 | | |
| Image Plane | ∞ | | | |

ASPHERIC DATA

5th Surface
K = 0.00000e+00 A 4 = −1.61047e−05 A 6 = 1.19890e−08 A 8 = −4.59302e−10
A10 = 1.71508e−12 A12 = −3.77878e−15
28th Surface
K = 0.00000e+00 A 4 = 1.75135e−05 A 6 = 6.78596e−07 A 8 = −8.10492e−09
A10 = 5.66788e−11 A12 = −1.89397e−13
29th Surface
K = 0.00000e+00 A 4 = 5.68500e−05 A 6 = 5.16256e−07 A 8 = −3.95802e−09
A10 = 2.01200e−11 A12 = −5.46951e−14

VARIOUS DATA
ZOOM RATIO 1.66

| | WIDE | MIDDLE | TELE |
|---|---|---|---|
| Focal Length | 17.51 | 20.00 | 29.10 |
| Fno | 2.88 | 2.88 | 2.89 |
| Half Angle of View (°) | 45.79 | 43.53 | 35.56 |
| Image Height | 18.00 | 19.00 | 20.80 |
| Overall Lens Length | 127.77 | 125.15 | 118.54 |
| BF | 10.38 | 10.38 | 10.38 |
| d9 | 22.36 | 17.12 | 1.30 |
| d11 | 6.29 | 7.66 | 9.16 |
| d13 | 5.44 | 4.08 | 2.58 |
| d29 | 4.67 | 7.28 | 16.50 |

LENS DATA DATA

| Lens Unit | Starting Surface | Focal Length |
|---|---|---|
| 1 | 1 | −38.90 |
| 2 | 10 | 81.13 |
| 3 | 12 | −47.05 |
| 4 | 14 | 25.19 |
| 5 | 30 | 87.65 |

Numerical Example 5

UNIT: mm

SURFACE DATA

| Surface No. | r | d | nd | νd |
|---|---|---|---|---|
| 1 | 74.640 | 1.40 | 1.95375 | 32.3 |
| 2 | 23.024 | 0.05 | 1.53344 | 52.7 |
| 3* | 20.291 | 7.18 | | |
| 4 | 78.770 | 1.20 | 1.48749 | 70.2 |
| 5 | 22.698 | 8.88 | | |
| 6 | −42.275 | 1.10 | 1.49700 | 81.7 |
| 7 | 65.581 | 0.28 | | |
| 8 | 44.155 | 5.88 | 1.90043 | 37.4 |
| 9 | −77.800 | (Variable) | | |
| 10 | 59.947 | 2.04 | 1.77250 | 49.6 |
| 11 | −497.873 | (Variable) | | |
| 12 | −27.717 | 0.85 | 1.80400 | 46.5 |
| 13 | −816.567 | (Variable) | | |
| 14 (SP) | ∞ | 0.61 | | |
| 15 | 54.261 | 5.36 | 1.49700 | 81.7 |
| 16 | −26.826 | 0.15 | | |
| 17 | 35.997 | 7.28 | 1.49700 | 81.7 |
| 18 | −20.476 | 0.95 | 1.83481 | 42.7 |

-continued

| UNIT: mm | | | | |
|---|---|---|---|---|
| 19 | −62.913 | (Variable) | | |
| 20 | −81.113 | 1.90 | 1.90366 | 31.3 |
| 21 | −34.112 | 0.90 | 1.61340 | 44.3 |
| 22 | 151.041 | 2.98 | | |
| 23 | 27.944 | 7.98 | 1.49700 | 81.7 |
| 24 | −27.944 | 0.25 | | |
| 25 | −74.984 | 6.77 | 1.53775 | 74.7 |
| 26 | −15.360 | 1.00 | 1.87070 | 40.7 |
| 27 | 729.466 | 1.42 | | |
| 28* | −161.561 | 1.70 | 1.58283 | 59.5 |
| 29* | 769.541 | (Variable) | | |
| Image Plane | ∞ | | | |

ASPHERIC DATA

3rd Surface
K = 0.00000e+00 A 4 = −1.18963e−05 A 6 = 1.98677e−08 A 8 = −2.70116e−10
A10 = 8.62807e−13 A12 = −1.49474e−15
28th Surface
K = 0.00000e+00 A 4 = −1.07322e−04 A 6 = 5.64090e−07 A 8 = −5.66215e−09
A10 = 4.05030e−11 A12 = −9.87271e−14
29th Surface
K = 0.00000e+00 A 4 = −6.27071e−05 A 6 = 4.21985e−07 A 8 = −2.67643e−09
A10 = 1.64691e−11 A12 = −3.83373e−14

VARIOUS DATA
ZOOM RATIO 1.65

| | WIDE | MIDDLE | TELE |
|---|---|---|---|
| Focal Length | 16.48 | 20.00 | 27.17 |
| Fno | 2.88 | 2.88 | 2.88 |
| Half Angle of View (°) | 47.52 | 43.53 | 37.44 |
| Image Height | 18.00 | 19.00 | 20.80 |
| Overall Lens Length | 126.45 | 119.00 | 112.83 |
| BF | 16.21 | 19.66 | 27.57 |
| d9 | 24.37 | 13.82 | 1.32 |
| d11 | 4.89 | 5.80 | 7.29 |
| d13 | 4.91 | 4.00 | 2.51 |
| d19 | 7.96 | 7.60 | 6.03 |
| d29 | 16.21 | 19.66 | 27.57 |

LENS DATA DATA

| Lens Unit | Starting Surface | Focal Length |
|---|---|---|
| 1 | 1 | −39.36 |
| 2 | 10 | 69.37 |
| 3 | 12 | −35.70 |
| 4 | 14 | 26.52 |
| 5 | 20 | −670.07 |

TABLE 1

| | Numerical Example | | | | |
|---|---|---|---|---|---|
| | 1 | 2 | 3 | 4 | 5 |
| fw | 16.48 | 16.48 | 15.45 | 17.51 | 16.48 |
| ft | 27.17 | 27.08 | 27.17 | 29.10 | 27.17 |
| f1 | −38.49 | −33.05 | −35.33 | −38.90 | −39.36 |
| BFw | 10.24 | 10.79 | 10.54 | 10.38 | 16.21 |
| fRw | 33.41 | 31.90 | 32.74 | 33.28 | 32.14 |
| ωw | 52.70 | 52.97 | 54.44 | 50.93 | 52.70 |
| LD1 | 25.32 | 20.79 | 25.90 | 23.51 | 25.97 |
| LD12w | 23.28 | 25.15 | 24.92 | 22.36 | 24.37 |
| TLw | 131.00 | 121.45 | 132.47 | 128.44 | 127.12 |
| TLt | 120.50 | 115.52 | 122.84 | 119.21 | 113.50 |
| SF11 | −1.72 | −1.97 | −1.70 | −2.03 | −1.89 |
| SF12 | −1.82 | −3.79 | −1.86 | −1.75 | −1.81 |
| nd1n | 1.65 | 1.72 | 1.65 | 1.65 | 1.65 |
| nd1p | 1.90 | 2.03 | 1.90 | 1.95 | 1.90 |
| νd1n | 61.40 | 56.43 | 61.40 | 61.39 | 61.40 |
| νd1p | 37.37 | 28.39 | 37.37 | 32.32 | 37.37 |
| (1)f1/fRw | −1.15 | −1.04 | −1.08 | −1.17 | −1.22 |

TABLE 1-continued

| | Numerical Example | | | | |
|---|---|---|---|---|---|
| | 1 | 2 | 3 | 4 | 5 |
| (2)BFw/(fw × tanωw) | 0.47 | 0.49 | 0.49 | 0.48 | 0.75 |
| (3)f1/fw | −2.34 | −2.01 | −2.29 | −2.22 | −2.39 |
| (4)f1/ft | −1.42 | −1.22 | −1.30 | −1.34 | −1.45 |
| (5)LD1/TLt | 0.21 | 0.18 | 0.21 | 0.20 | 0.23 |
| (6)TLt/TLw | 0.92 | 0.95 | 0.93 | 0.93 | 0.89 |
| (7)LD12/TLw | 0.18 | 0.21 | 0.19 | 0.17 | 0.19 |
| (8)f1/TLw | −0.29 | −0.27 | −0.27 | −0.30 | −0.31 |
| (9)SF11 | −1.72 | −1.97 | −1.70 | −2.03 | −1.89 |
| (10)SF12 | −1.82 | −3.79 | −1.86 | −1.75 | −1.81 |
| (11)nd1n − nd1p | −0.25 | −0.30 | −0.25 | −0.31 | −0.25 |
| (12)νd1n/νd1p | 1.64 | 1.99 | 1.64 | 1.90 | 1.64 |
| (13)DRMAX | 0.206 | 0.126 | 0.3 | 0.201 | 0.201 |
| (14)ωw | 52.70 | 52.97 | 54.44 | 50.93 | 52.70 |

Image Pickup Apparatus

Figure 12:
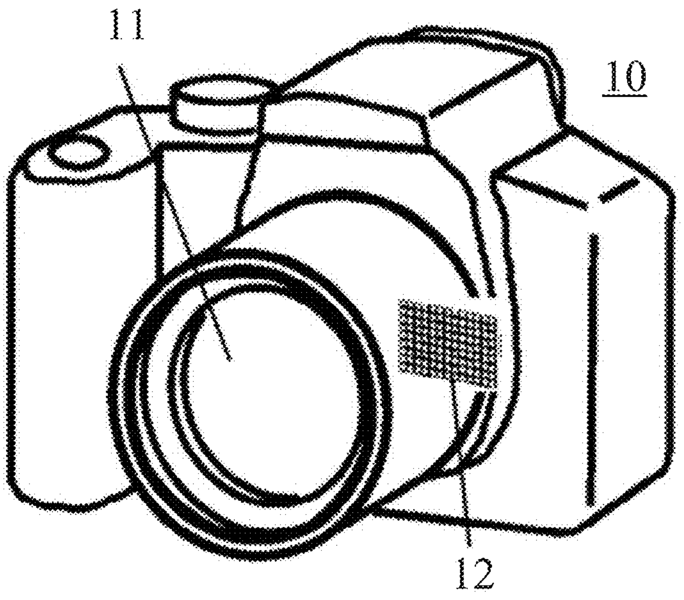
FIG. 12 explains a method of calculating inequalities for aspheric shapes.

FIG. 12 illustrates a digital still camera as an image pickup apparatus using the zoom lens according to any one of Examples 1 to 5 as the imaging optical system. In FIG. 12, reference numeral 10 denotes a camera body, and reference numeral 11 denotes an imaging optical system including any one of the zoom lenses according to Examples 1 to 5.

Reference numeral 12 denotes an image sensor such as a CCD sensor or CMOS sensor that is built into the camera body 10 and photoelectrically converts an object image formed by the imaging optical system 11 (i.e., captures the subject).

The camera body 10 may be a single-lens reflex camera with a quick-turn mirror, or a mirrorless camera without a quick-turn mirror.

Thus, applying the zoom lens according to any one of the above examples to an image pickup apparatus such as a digital still camera can achieve an image pickup apparatus that has a reduced size but can provide high-quality images.

While the disclosure has described example embodiments, it is to be understood that some embodiments are not limited to the disclosed embodiments.

The scope of the following claims is to be accorded the broadest interpretation so as to encompass all such modifications and equivalent structures and functions.

Each example can provide a zoom lens that has a wide angle of view, a large aperture diameter, and high optical performance.

This application claims priority to Japanese Patent Application No. 2023-205264, which was filed on Dec. 5, 2023, and which is hereby incorporated by reference herein in its entirety.

What is claimed is:

1. A zoom lens comprising lens units arranged in order from an object side to an image side, wherein the lens units consist of:

a first lens unit having negative refractive power; and a rear group including at least three lens units and having combined positive refractive power at a wide-angle end, wherein a distance between adjacent lens units changes during zooming, wherein the first lens unit includes three negative lenses consecutively arranged from the object side to the image side, and wherein the following inequalities are satisfied:

$$-2.5<f1/fRw<-1.0$$

$$0.3\leq BFw/(fw\times\tan\omega w)\leq 0.8$$

where f1 is a focal length of the first lens unit, fRw is a focal length of the rear group at the wide-angle end, BFw is a back focus of the zoom lens at the wide-angle end, fw is a focal length of the zoom lens at the wide-angle end, and ωw is a half angle of view of the zoom lens at the wide-angle end.

2. The zoom lens according to claim 1, wherein the following inequality is satisfied:

$$-3.0\leq f1/fw\leq -1.0.$$

3. The zoom lens according to claim 1, wherein the following inequality is satisfied:

$$-2.0\leq f1/ft\leq -0.5$$

where ft is a focal length of the zoom lens at a telephoto end.

4. The zoom lens according to claim 1, wherein the following inequality is satisfied:

$$0.10\leq LD1/TLt\leq 0.30$$

where LD1 is a length on an optical axis of the first lens unit L1, and TLt is an overall optical length of the zoom lens at a telephoto end.

5. The zoom lens according to claim 1, wherein the following inequality is satisfied:

$$0.70\leq TLt/TLw\leq 1.10$$

where TLw is an overall optical length of the zoom lens at the wide-angle end, and TLt is an overall optical length of the zoom lens at a telephoto end.

6. The zoom lens according to claim 1, wherein the rear group includes a second lens unit closest to an object, and wherein the following inequality is satisfied:

$$0.10\leq LD12w/TLw\leq 0.30$$

where LD12w is a distance on an optical axis between the first lens unit and the second lens unit at the wide-angle end, and TLw is an overall optical length of the zoom lens at the wide-angle end.

7. The zoom lens according to claim 1, wherein the following inequality is satisfied:

$$-0.40\leq f1/TLw\leq -0.20$$

where TLw is an overall optical length of the zoom lens at the wide-angle end.

8. The zoom lens according to claim 1, wherein the following inequality is satisfied:

$$-2.5\leq SF11\leq -1.2$$

where R1 is a radius of curvature of a surface on the object side of one of the three negative lenses which is disposed closest to an object, R2 is a radius of curvature of a surface on the image side of the one of the three negative lenses, and SF11=(R2+R1)/(R2−R1).

9. The zoom lens according to claim 1, wherein the following inequality is satisfied:

$$-4.5\leq SF12\leq -1.2$$

where R3 is a radius of curvature of a surface on the object side of one of the three negative lenses which is a second negative lens counted from the object side, R4 is a radius of curvature of a surface on the image side of the one of the three negative lenses, and SF12=(R4+R3)/(R4−R3).

10. The zoom lens according to claim 1, wherein the first lens unit further includes at least one positive lens and at least three negative lenses, and wherein the following inequality is satisfied:

$$-0.40\leq nd1n-nd1p\leq -0.20$$

where nd1p is an average of refractive indexes for d-line of the at least one positive lens, and nd1n is an average of refractive indexes for the d-line of the at least three negative lenses.

11. The zoom lens according to claim 1, wherein the first lens unit includes at least one positive lens and at least three negative lenses, and wherein the following inequality is satisfied:

$$1.2\leq \nu d1n/\nu d1p\leq 2.5$$

where νd1p is an average of the Abbe numbers based on d-line of the at least one positive lens, and νd1n is an average of the Abbe numbers based on the d-line of the at least three negative lenses.

12. The zoom lens according to claim 1, wherein the first lens unit includes an aspheric lens, and wherein the following inequality is satisfied:

$$0.05\leq DRMAX\leq 0.40$$

where DRMAX is a maximum absolute value of an aspheric amount of the aspheric lens.

13. The zoom lens according to claim 1, wherein the following inequality is satisfied:

$$45° \leq \omega w \leq 60°$$

where ωw is a half angle of view of the zoom lens at the wide-angle end.

14. The zoom lens according to claim 1, wherein the lens units arranged in order from the object side to the image side consist of:

the first lens unit;

a second lens unit having positive refractive power;

a third lens unit having negative refractive power;

a fourth lens unit having positive refractive power; and a fifth lens unit having positive refractive power.

15. The zoom lens according to claim 1, wherein the lens units arranged in order from the object side to the image side consist of:

the first lens unit;

a second lens unit having negative refractive power;

a third lens unit having positive refractive power; and a fourth lens unit having positive refractive power.

16. The zoom lens according to claim 1, wherein the lens units arranged in order from the object side to the image side consist of:

the first lens unit;

a second lens unit having positive refractive power;

a third lens unit having negative refractive power;

a fourth lens unit having positive refractive power;

a fifth lens unit having positive refractive power; and a sixth lens unit having positive refractive power.

17. The zoom lens according to claim 1, wherein the lens units arranged in order from the object side to the image side consist of:

the first lens unit;

a second lens unit having positive refractive power;

a third lens unit having negative refractive power;

a fourth lens unit having positive refractive power; and a fifth lens unit having negative refractive power.

18. An image pickup apparatus comprising:

a zoom lens; and an image sensor for capturing an object through the zoom lens, wherein the zoom lens includes, in order from an object side to an image side:

a first lens unit having negative refractive power; and a rear group including at least three lens units and having combined positive refractive power at a wide-angle end, wherein a distance between adjacent lens units changes during zooming, wherein the first lens unit includes three negative lenses consecutively arranged from the object side to the image side, and wherein the following inequalities are satisfied:

$$-2.5 < f1/fRw < -1.0$$

$$0.3 \leq BFw/(fw \times \tan \omega w) \leq 0.8$$

where f1 is a focal length of the first lens unit, fRw is a focal length of the rear group at the wide-angle end, BFw is a back focus of the zoom lens at the wide-angle end, fw is a focal length of the zoom lens at the wide-angle end, and ωw is a half angle of view of the zoom lens at the wide-angle end.

* * * * *